(12) United States Patent
Dixon et al.

(10) Patent No.: US 12,381,416 B2
(45) Date of Patent: Aug. 5, 2025

(54) SYSTEM AND A METHOD FOR AUTOMATING MATCHING OF ENERGY LOAD WITH ENERGY GENERATION FOR ENERGY CONSUMERS, UTILITIES, AND GRID OPERATORS

(71) Applicant: Singularity Energy, Inc., Somerville, MA (US)

(72) Inventors: Paul Dixon, Seattle, WA (US); Greg Miller, Eugene, OR (US); Wenbo Shi, Cambridge, MA (US); Ryan Baker, Cambridge, MA (US); Karl Breustedt, Brooklyn, NY (US); Brooke Vinole, Somerville, MA (US)

(73) Assignee: Singularity Energy, Inc., Somerville, MA (US)

( * ) Notice: Subject to any disclaimer, the term of this patent is extended or adjusted under 35 U.S.C. 154(b) by 19 days.

(21) Appl. No.: 18/751,760

(22) Filed: Jun. 24, 2024

(65) Prior Publication Data
US 2024/0429739 A1    Dec. 26, 2024

Related U.S. Application Data

(60) Provisional application No. 63/509,545, filed on Jun. 22, 2023.

(51) Int. Cl.
*H02J 13/00* (2006.01)
(52) U.S. Cl.
CPC ..... *H02J 13/00001* (2020.01); *H02J 2203/10* (2020.01)

(58) Field of Classification Search
CPC .................................................. H02J 2203/10
See application file for complete search history.

(56) References Cited

U.S. PATENT DOCUMENTS

| | | | | |
|---|---|---|---|---|
| 11,715,952 | B2 * | 8/2023 | Gokhale | G06Q 50/06 705/412 |
| 2010/0264739 | A1 * | 10/2010 | Errington | H02J 1/10 307/80 |
| 2012/0323382 | A1 * | 12/2012 | Kamel | G06Q 50/06 700/286 |
| 2020/0151836 | A1 * | 5/2020 | Lingras | G06Q 50/163 |
| 2021/0057914 | A1 * | 2/2021 | Sun | G05B 19/042 |
| 2022/0247174 | A1 * | 8/2022 | Miller | H02J 3/004 |
| 2024/0266829 | A1 * | 8/2024 | Brennan | H02J 7/35 |

* cited by examiner

*Primary Examiner* — Nathan L Laughlin
(74) *Attorney, Agent, or Firm* — Caldwell Intellectual Property Law

(57) ABSTRACT

A system for automating matching of energy load with energy generation for energy consumers, utilities, and grid operators, comprising a processor and a memory containing instructions configuring the processor to collect, from a grid network connecting load centers and generation sources, energy datasets including energy attribute records and energy load data, match each load center to the generation sources based on the energy datasets, matching further comprises generating actionable energy models, each one of the actionable energy models representing a configurable allocation of the energy attribute records, based on the energy datasets, and matching the load centers and generation sources as a function of at least one actionable energy model, populate an allocation report for each load center, and transmit the allocation report to an external device in communication with the processor.

20 Claims, 12 Drawing Sheets

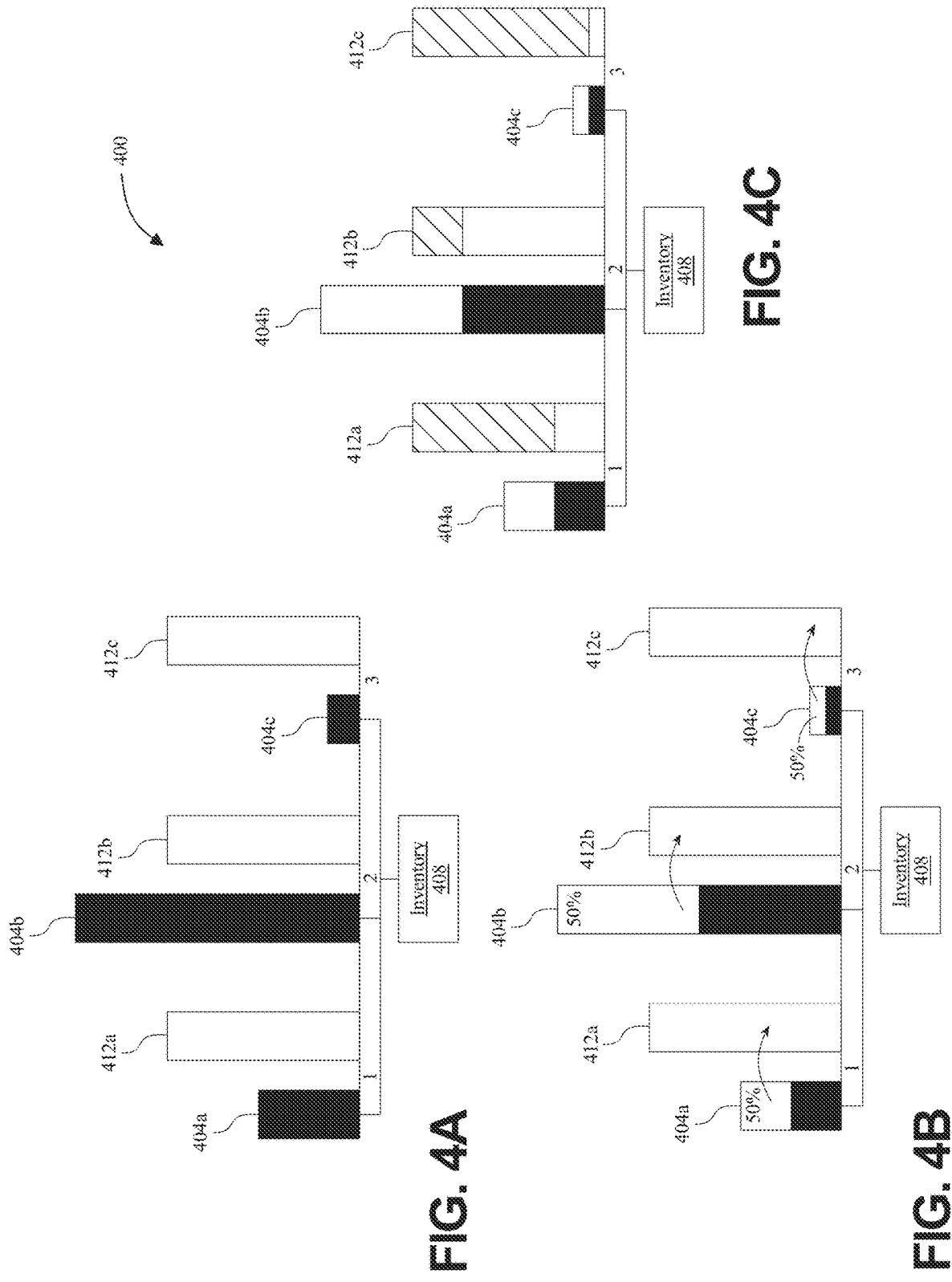

SYSTEM AND A METHOD FOR AUTOMATING MATCHING OF ENERGY LOAD WITH ENERGY GENERATION FOR ENERGY CONSUMERS, UTILITIES, AND GRID OPERATORS

CROSS-REFERENCE TO RELATED APPLICATIONS

This application claims the benefit of priority of U.S. Provisional Patent Application Ser. No. 63/509,545, filed on Jun. 22, 2023, and titled "SYSTEM AND METHOD FOR ENERGY ATTRIBUTE CERTIFICATE INVENTORY TRACKING, MANAGEMENT AND OPTIMIZATION FOR UTILITIES AND GRID OPERATORS AND THEIR PARTNERS, SUPPLIERS AND CUSTOMERS," which is incorporated by reference herein in its entirety.

FIELD OF THE INVENTION

The present invention generally relates to the field of energy management systems. In particular, the present invention is directed to a system and a method for automating matching of energy load with energy generation for energy consumers, utilities, and grid operators.

BACKGROUND

The efficient and equitable distribution of energy sources presents significant challenges for utilities and energy providers. As the demand for clean and renewable energy continues to rise, so does the complexity of managing energy generation, allocation, and consumption. Energy providers must balance the need to meet regulatory requirements, optimize operational efficiency, and satisfy customer preferences for renewable energy sources. Utilities often face difficulties in accurately matching the energy produced from various sources including carbon-free and non-carbon-free, renewable and non-renewable, or both, with the actual consumption of their customers, which lead to inefficiencies, increased costs, and suboptimal utilization of renewable energy resources.

SUMMARY OF THE DISCLOSURE

In an aspect, a system for automating matching of energy load with energy generation for energy consumers, utilities, and grid operators is described. The system includes at least a processor, and a memory communicatively connected to the at least a processor, wherein the memory contains instructions configuring the at least a processor to collect, from a grid network connecting a plurality of load centers and a plurality of generation sources, a plurality of energy datasets, wherein the plurality of energy datasets includes a set of energy attribute records and energy load data, match, using a matching engine, each load center of the plurality of load centers to the one or more generation sources of the plurality of generation sources based on the plurality of energy datasets, wherein matching the plurality of load centers to the plurality of generation sources includes generating a plurality of actionable energy models, each of the plurality of actionable energy models representing a configurable allocation of the set of energy attribute records, based on the plurality of energy datasets, and matching, as a function of at least one actionable energy model of the plurality of actionable energy models, each load center of the plurality of load centers to the one or more generation sources of the plurality of generation sources, populate, as a function of the at least one actionable energy model, an allocation report for each load center of the plurality of load centers within the grid network, and transmit the populated allocation report to an external device in communication with the at least a processor.

In another aspect, a system for automating matching of energy load with energy generation for energy consumers, utilities, and grid operators is described. The method includes collecting, by at least a processor, a plurality of energy datasets from a grid network connecting a plurality of load centers and a plurality of generation sources, wherein the plurality of energy datasets includes a set of energy attribute records and energy load data, matching, by the at least a processor, each load center of the plurality of load centers to the one or more generation sources of the plurality of generation sources based on the plurality of energy datasets using a matching engine, wherein matching the plurality of load centers to the plurality of generation sources includes generating a plurality of actionable energy models, each of the plurality of actionable energy models representing a configurable allocation of the set of energy attribute records, based on the plurality of energy datasets; and matching, as a function of at least one actionable energy model of the plurality of actionable energy models, each load center of the plurality of load centers to the one or more generation sources of the plurality of generation sources, populating, by the at least a processor, an allocation report for each load center of the plurality of load centers within the grid network as a function of the at least one actionable energy model, and transmitting, by the at least a processor, the populated allocation report to an external device in communication with the at least a processor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A-C illustrate an exemplary workflow of an hourly energy allocation;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to a system and method for automating matching of energy load with energy generation for energy consumers, utilities, and grid operators. The system includes at least a processor and a memory communicatively connected to the at least a processor, wherein the memory contains instructions configuring the at least a processor to collect, from a grid network connecting a plurality of load centers and a plurality of generation sources, a plurality of energy datasets, wherein the plurality of energy datasets includes a set of energy attribute records and energy load data, match, using a matching engine, each load center of the plurality of load centers to the one or more generation sources of the plurality of generation sources based on the plurality of energy datasets, wherein matching the plurality of load centers to the plurality of generation sources includes generating a plurality of actionable energy models, each of the plurality of actionable energy models representing a configurable allocation of the set of energy attribute records, based on the plurality of energy datasets, and matching, as a function of at least one actionable energy model of the plurality of actionable energy models, each load center of the plurality of load centers to the one or more generation sources of the plurality of generation sources, populate, as a function of the at least one actionable energy model, an allocation report for each load center of the plurality of load centers within the grid network, and transmit the populated allocation report to an external device in communication with the at least a processor.

Figure 1:
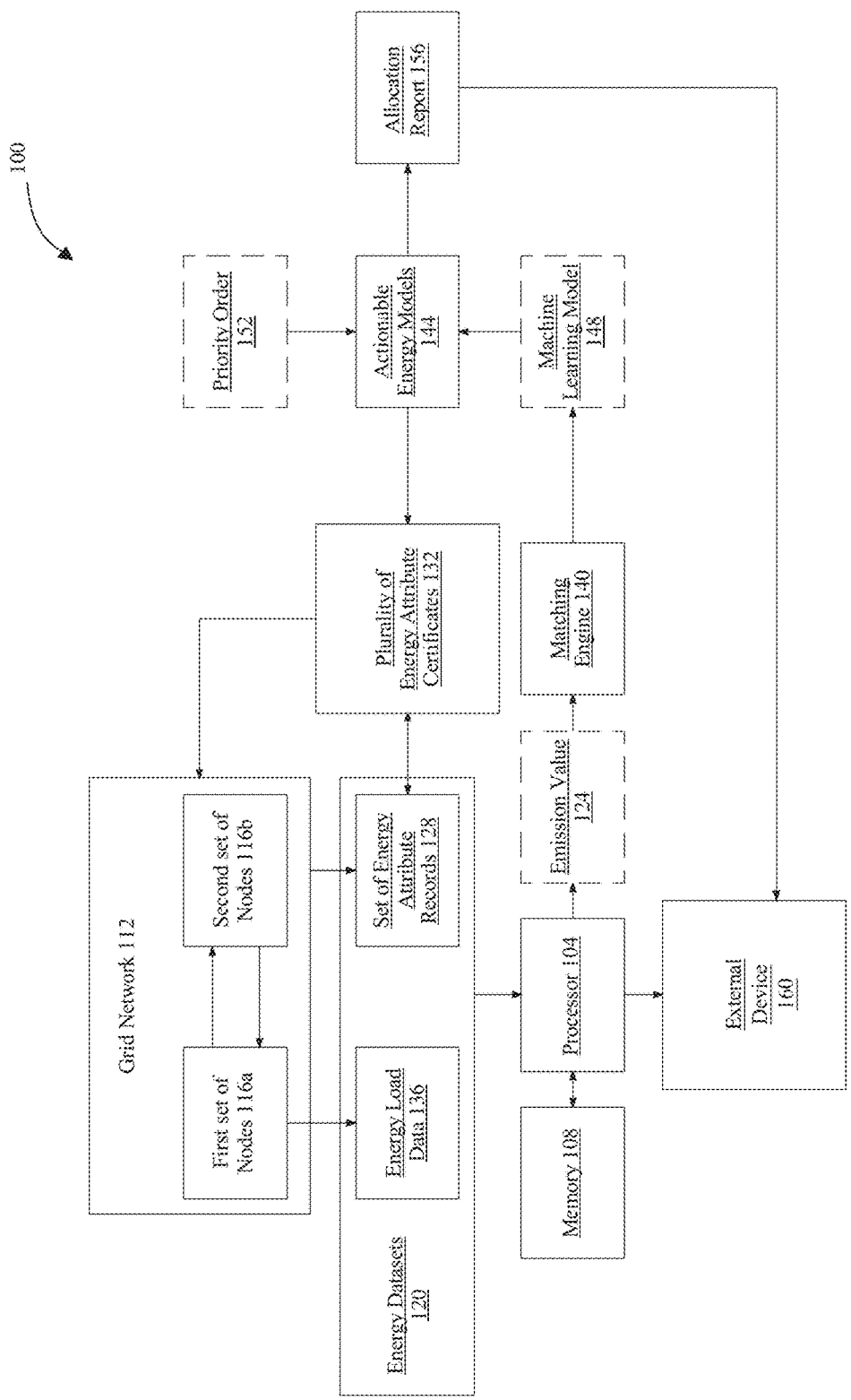
FIG. 1 is an exemplary embodiment of a system for automating matching of energy load with energy generation for energy consumers, utilities, and grid operators.

Referring now to FIG. 1, an exemplary embodiment of a system 100 matching of energy load with energy generation for energy consumers, utilities, and grid operators for automating is illustrated. System 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a memory 108. Memory 108 is communicatively connected to processor 104. Memory 108 may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to collect from a grid network 112 connecting a plurality of load centers 116a to a plurality of generation sources 116b, a plurality of energy datasets. As used in this disclosure, a "grid network" is an interconnected power infrastructure designed for generation, transmission, and distribution of energy from producers to consumers. As a non-limiting example, grid network 112 may include an electrical power system or a power grid; power, such as electricity may efficiently flow across a plurality of geographical areas via the said grid network 112. In one embodiment, grid network 112 may include a plurality of interconnected nodes. As described herein, "nodes" are specific points where power is generated, transmitted, distributed, or consumed. Plurality of interconnected nodes may be categorized into first set of nodes and second set of nodes, wherein first set of nodes may include a plurality of load centers 116a while second set of nodes may include a plurality of generation sources 116b. As used in this disclosure, "load centers," also known as "energy-consuming nodes," are endpoints or entities where energy, such as electricity, is consumed. Exemplary embodiments of energy-consuming nodes may include, without limitation, residential homes, commercial buildings, industrial facilities, any other end-user locations and combinations thereof. On the other hand, "generation sources" also known as "energy-generating nodes," are endpoints or entities where energy is generated or introduced into grid network 112. Exemplary embodiments of energy-generating nodes may include, without limitation, conventional power plants, renewable energy installations, points of import/export, and any combinations thereof. In some cases, generation sources may include, without limitation, energy storage sources; for example, plurality of generation sources 116b may further include utility scale storage, utility scale batteries, pumped storage hydropower (PSH), among others.

With continued reference to FIG. 1, in some cases, each load center (i.e., energy-consuming node) within plurality of load centers 116a may be characterized by, for example, its energy load data as described below (e.g., amount of power such as electricity consumed over time). As a non-limiting example, homes and apartments that consume electricity for lighting, heating, cooling, and/or powering any other household appliances, offices, retail stores, and other commercial establishments that use electricity for any business operations, factories, manufacturing plants, and other industrial sites with significant energy consumption for any production processes may be considered as plurality of load centers 116a, while power plants, renewable energy sources that produce electricity and feed produced electricity into grid network 112, points where electricity is imported into, or in other cases, exported out of grid network 112 that facilitate the interconnections between plurality of nodes, and locations associated with, for instance, the creation and management of energy attribute records as described below (e.g., RECs, EACs, and GCs) may be considered as plurality of generation sources 116b.

With continued reference to FIG. 1, "energy datasets," as described herein, are collections of structured data that encapsulate attributes, measurements, and metadata associated with the generation, transmission, distribution, or consumption of energy within grid network 112. In one or more embodiments, a plurality of energy datasets may include a range of information from both generation sources e.g., producers and load centers e.g., consumers. In some cases, a plurality of energy datasets 120 may be collected from various data sources. Exemplary embodiments of data source may include, without limitation, utility internal source (i.e., data generated and maintained within utility's own infrastructure), utility customer source (i.e., data collected directly from end-users of the energy), registries (i.e., external databases and systems that track issuance, allocation, and retirement of energy attribute records and other energy attributes), and/or any other third parties (i.e., additional external source that provide relevant data for energy management as described herein).

With continued reference to FIG. 1, as a non-limiting example, one or more energy datasets of a plurality of energy datasets 120 may include data related to generation sources e.g., generation facilities such as power plants and renewable energy installations owned or operated by the utility. Such energy datasets may include, without limitation, real-time output data, operational status, or emissions data related to the facilities. For instance, energy datasets may include one or more measurements, or information gathered from monitoring power such as electrical energy produced by generation facilities e.g., one or more real-time measurements of the amount of electricity generated and recorded in megawatt-hours (MWh), type of fuel used for generation (for example, coal, natural gas, nuclear, wind, solar, or hydroelectric), facility uptime, downtime, maintenance schedules, log of unexpected outages, performance indicators such as capacity factor, efficiency rates, production costs, among others. In some cases, energy datasets collected from utility internal source may include one or more measurements, or information gathered from monitoring of electrical energy consumed by end users (i.e., load centers) e.g., real-time data on energy consumption measured by, for example, smart meters installed at load centers.

With continued reference to FIG. 1, in one or more embodiments, energy datasets collected from utility internal sources may additionally, or alternatively, include carbon data involving measurements and tracking of carbon emissions associated with energy generation and consumption. As a non-limiting example, plurality of energy datasets 120 may include one or more datasets containing emission data e.g., real-time and/or historical data on greenhouse gas emissions. Greenhouse gas may include, without limitation, carbon dioxide (CO2), CO2e, methane (CH4), nitrogen oxides (NOx), Sox, among others from plurality of generation sources 116b. In some cases, system 100 may calculate an emission value 124 for each energy dataset of plurality of energy datasets 120. As used in this disclosure, an "emission value" is a quantified measure of greenhouse gas emission associated with the production, transmission, or consumption of energy within grid network 112. In some cases, a separate emission value may be calculated for each energy dataset of plurality of energy datasets 120 on different type of emission. As a non-limiting example, emission value may include a carbon (or carbon dioxide CO2) emission representing an amount of CO2 produced as a result of energy generation, particularly from fossil fuel-based sources such as coal, natural gas, and oil. Such emission value may be measured in kilograms (kg) or metric tons (t) per megawatt-hour (MWh) of electricity generated.

With continued reference to FIG. 1, in other embodiments, energy datasets collected from utility internal source may include user data; for example, and without limitation, system 100 may integrated with other systems that manage customer accounts, billing information, or payment records, and/or online platforms that allow, in some cases, customers to view their energy usage, manage user accounts, and participate in demand response programs. Such energy datasets may be collected, for example, without limitation, from utility internal source via one or more application programming interfaces (APIs). As used herein, an "application programming interface" is a set of functions that allow applications to access data and interact with external software components, operating systems, or microdevices, such as another web application or computing device. An API may define the methods and data formats that applications can use to request and exchange information such as plurality of energy datasets 120. In some cases, APIs enable seamless integration and functionality between different systems, applications, or platforms.

With continued reference to FIG. 1, as another non-limiting example, plurality of energy datasets 120 may include one or more energy datasets 120 collected from utility customer source; this may include data related to power generated "behind-the-meter" (BTM) i.e., on-site by plurality of load centers 116a e.g., customers using distributed energy resources, such as solar photovoltaic (PV) systems (e.g., solar panels), small-scale or large-scale wind turbines installed at load centers, combined heat and power systems, fuel cells, and the like. In other cases, such energy datasets may also include data related to BTM storages (i.e., energy storage systems) installed on customer premises, designed to store energy for later use. Exemplary embodiments of BTM storage may include, without limitation, battery energy storage system (BESS), thermal energy storage, and the like.

With continued reference to FIG. 1, in some embodiments, processor 104 may collect plurality of energy datasets 120 from registries, such as, without limitation, Midwest Renewable Energy Tracking System (M-RETS), Xpansiv Environmental Market Account (EMA), PJM Generation Attribute Tracking System, and/or the like. Plurality of energy datasets 120 includes energy datasets representing a plurality of energy attribute records 128 provided by the generation sources 116b. As used in this disclosure, "energy attribute records" are certificates that represent environmental attributes of a specific amount of energy generated from generation sources. "Environmental attributes," as described herein, are characteristics associated with the environmental impact of energy generation, distribution, and consumption. Plurality of generation sources 116b may include any energy source including, but not limited to, renewable, non-renewable, carbon-free, non-carbon-free, and/or the like. In one embodiment, plurality of energy attribute records 128 may include a plurality of energy attribute certificate 132 including renewable energy certificates (RECs), non-renewable energy certificates (NRECs), carbon-free energy certificates, or non-carbon-free energy certificates. An "energy attribute certificate," for the purpose of this disclosure, is a data object that represents the environmental and other attributes associated with the generation of the specific amount of energy, regardless of the energy source. Plurality of energy attribute certificates 132 may be used to, for example, at least in part, track, verify, and trade the attributes and, in some cases, the benefits of energy generation; thus, providing a manageable mechanism for optimizing energy portfolios.

With continued reference to FIG. 1, "renewable energy certificates," for the purpose of this disclosure, are certificates representing environmental attributes associated with the generation of a specific amount of energy exclusively generated from renewable energy source, while "non-renewable energy certificates," for the purpose of this disclosure, are certificates that track non-renewable energy generation. As a non-limiting example, each one of the renewable energy certificates may represent a specific amount e.g., 1 MWh of energy generated or more from renewable energy sources, such as, without limitation, wind, solar, hydroelectric, biomass, and/or the like. Conversely, non-renewable energy certificates may represent 1 MWh energy generated from non-renewable energy sources, such as, without limitation, coal, natural gas, oil, and/or the like. In some cases, each energy attribute record of the plurality of energy attribute records 128 may be associated with a timestamp indicating when the corresponding energy attribute record i.e., specified amount of energy, was generated.

With continued reference to FIG. 1, "carbon-free energy certificates (CFECs)," for the purpose for the purpose of this disclosure, are certificates representing environmental attributes of energy generated from carbon-free sources. In some cases, exemplary embodiments of carbon-free sources may include, without limitation, nuclear, wind, solar, hydro, and/or the like, where the generation process does not emit CO2 or other aforementioned greenhouse gases. In an embodiment, CFECs may be a broader category that includes, for example, all carbon-free energy sources encompassing both renewable sources and non-renewable carbon-free sources e.g., nuclear power. As a non-limiting example, all RECs in plurality of energy attribute certificates may be carbon-free; however, it should be noted that not all CFECs are RECs because CFECs may also come from non-renewable but carbon-free sources like nuclear power. Conversely, "non-carbon-free energy certificates (NCEFCs)" are certificates representing environmental attributes of energy generated from generation sources that emit CO2 or other aforementioned greenhouse gases during generation process. In some cases, exemplary embodiments of non-carbon-free sources may include, without limitation, coal, natural gas, oil, and/or the like. As non-limiting examples, plurality of energy attribute certificates may include one or more CFECs, each one of the CFECs may be associated with 1 MWh of electricity generated from a nuclear plant, and one or more NCEFCs, each one of the NCEFCs may be associated with 1 MWh of electricity generated from a natural gas plant.

With continued reference to FIG. 1, in some cases, system 100 may be configured to serialize plurality of energy attribute records 128 into a plurality of energy attribute certificates 132, for example, and without limitation, as a function of plurality of energy datasets 120. In one or more embodiments, each energy attribute certificate of plurality of energy attribute certificate 132 may include a plurality of structured data objects, each representing the generated energy and its associated attributes, such as, without limitation, metadata that describe associated attributes e.g., the type of fuel used, emission data, generation source location, generation time, the vintage date of the generator, and other relevant certification information. As a non-limiting example, energy datasets including information on energy production from different sources, including renewable, non-renewable, carbon-free, and non-carbon-free energy and data on energy usage by consumers including residential, commercial, and industrial nodes may be standardized, validated, and aggregated into a comprehensive dataset. Processor 104 may extract one or more relevant attributes from the comprehensive datasets, such as, without limitation, energy quantity, energy source, emission value 124, operational efficiency, among others, and generate plurality of energy attribute records 128 by initializing a plurality of data objects based on the extracted attributes. Serialized energy attribute certificates may be stored in an inventory as described below and tracked throughout their lifecycle, from issuance to retirement. For instance, and without limitation, once a CFEC has been used to claim one or more environmental benefits, it may be retired. Registries or inventory as described herein may update, for example, and without limitation, the status of the CFEC to reflect that it has been used and can no longer be traded or counted towards environmental goals.

With continued reference to FIG. 1, in some cases, generating plurality of energy attribute records 128 or energy attribute certificates may include measuring, at generation sources 116b, their energy production and associated attributes. Processor 104 may be configured to verify the measured energy production and associated attributes to ensure the energy generation and associated attributes are accurate and match with established standards at registries. Based on the verified data, system 100 may generate and/or issue plurality of energy attribute records 128, each with a unique identified and detailed information, for example, information about the energy generation, generation source i.e., metadata related to second nodes, and corresponding energy attributes. In one or more embodiments, plurality of energy datasets 120 may include a plurality of power flow data measured from at least a grid monitoring device communicatively connected to the grid network 112. Exemplary power flow data may include an amount of power, in watts, kilowatts, megawatts, or the like, being generated by a given power generator (i.e., second node), measured by an exemplary grid monitoring device, such as, without limitation, any monitoring device operated by an independent system operator (ISO). For instance, and without limitation, plurality of energy datasets 120 may include any power flow data measured by any grid monitoring device as described in U.S. patent application Ser. No. 18/082,455, filed on Dec. 20, 2022, and entitled "AN APPARATUS AND METHOD FOR OPTIMIZING CARBON EMISSIONS IN POWER GRID," the entirety which is incorporated herein by reference.

With continued reference to FIG. 1, in some cases, each energy attribute certificate may be associated with a certificate status; for instance, and without limitation, an "active" energy attribute certificate may indicate that the corresponding energy attribute record may be currently available for use, or in some cases, for trading, while a "traded" or "retired" energy attribute certificate may indicate that the corresponding energy attribute record may have been bought, sold, or otherwise used and it is no longer available on platform. System 100 as described herein may provide, in some cases, a market-based mechanism for trading attributes of energy and energy attribute records that create various financial incentives for the development and deployment of various renewable, non-renewable, and low-emission energy projects. Utilities and other entities may use energy attribute records to, for example, meet established renewable energy mandates, carbon reduction targets, and other regulatory compliance requirements. As a non-limiting example, corporations may purchase tradable energy attribute records to offset their carbon footprint and support sustainability goals by claiming the use of specific type of renewable energy even if they cannot directly purchase it from the grid network 112.

With continued reference to FIG. 1, energy attribute record may be issued by nodes e.g., recognized registry or certification body that tracks the generation and attributes of energy, such as M-RETS, Xpansiv EMA, PJM Generation Attribute Tracking System, and/or the like as described above. In one or more embodiments, each energy attribute record of plurality of energy attribute records 128 may be assigned a unique identifier, wherein the unique identifier may be used to distinctly identify the corresponding energy attribute record and may further prevent double counting. Additionally, or alternatively, processor 104 may be configured to apply emission value 124 to each energy dataset of plurality of energy datasets 120; for instance, and without limitation, system 100 may associated calculated emission value 128 to each energy attribute record of plurality of energy attribute records 128 to provide an accurate emission reporting, in some cases, on a pre-MWh basis.

With continued reference to FIG. 1, in other embodiments, plurality of energy datasets 120 may include additional data collected from other third-party data sources, such as, without limitation, environmental protection agency (EPA), energy information administration (EIA), continuous emissions monitoring systems (CEMS), independent system operators, and the like. In these cases, plurality of energy datasets 120 may include, without limitation, real-time emission data, emission deviations, emission forecast data, air quality data, records of regulatory compliance and violations for emissions, generation data, consumption data, capacity data, market data, grid operation data, transmission data, services data, renewable portfolio standards (RPS), energy efficiency data, meteorological data, events data, trading data, and/or the like. A person skilled in the art, upon reviewing the entirety of this disclosure, will be aware of various energy dataset data entries or energy datasets may be collected, integrated, and utilized within system 100.

With continued reference to FIG. 1, further, plurality of energy datasets 120 includes energy load data 136. In some cases, processor 104 may be configured to receive energy load data 136 from each load center of plurality of load centers 116a. As used in this disclosure, "energy load data" is information related to consumption of energy at various points within grid network 112. Exemplary embodiments of energy load data 136 may include, without limitation, measurements of energy usage over specific time intervals, additional attributes that provide insights into consumption patterns, peak demand periods, overall energy efficiency, and/or the like. As a non-limiting example, processor 104 may receive energy load data 136 such as consumption measurements, including instantaneous readings of energy consumption at a particular moment and/or energy usage recorded at regular intervals, such as, without limitation, every hour, day, week, month, quarter, or year. In another embodiment, energy load data 136 may specify, for example, and without limitation, a maximum load i.e., a highest level of energy consumption recorded within a specific period i.e., per hour. As a non-limiting example, processor 104 may receive a load profile containing variation of energy, such as electricity, consumption over time, indicating how demand fluctuates throughout the day, week, month, quarter, or year. Additionally, or alternatively, processor 104 may receive, in some cases, historical usage data, such as, without limitation, historical data showing energy consumption patterns over an extended period e.g., years. Changes in energy usage corresponding to different seasons or weather conditions may also be included. In other embodiments, energy load data 136 may further include information on voltage stability each load center, data on frequency stability of each generation source of plurality of generation sources 116b i.e., energy supplies, data on load reductions achieved during demand response, data on which first nodes involved in demand response events (including respective load adjustments), and the like. In a non-limiting embodiment, grid monitoring devices, such as smart meters installed at load center (in some cases, a grid monitoring device may be a load center) may be used to provide energy load data 136 via wireless or wired communication networks, for example, through advanced metering infrastructure (AMI). Additionally, or alternatively, energy load data 136 may include, in some cases, collection of data from customer contracts, tariffs, and program enrollments (i.e., program data) to reflect, for example, and without limitation, one or more contractual relationships and prior or current commitments between load center and plurality of generation sources 116b within grid network 112. In some cases, energy load data 136 may be sent to a central data repository e.g., a datastore as described in detail below with reference to FIG. 2.

With continued reference to FIG. 1, processor 104 may be configured to align each load center of plurality of load centers 116a to one or more generation source of plurality of generation sources 116b as a function of energy load data 136. In one or more embodiment, processor 104 may be configured to analyze energy load data from each load center of plurality of load centers 116a to derive, for example, a plurality of energy requirements including, without limitation, total amount of energy demanded, demand times, average consumption rates, energy usage patterns, among others. In some cases, processor 104 may be also configured to determine availability, generation capacity, type of energy produced, and/or the like of plurality of generation sources 116b based on plurality of energy datasets 120. As a non-limiting example, processor 104 may implement a contractual alignment process where processor 104 may be configured to algin demand e.g., load centers with supply e.g., generation sources by align energy demand at each load center with available supply from generation sources or inventory as described below. Processor 104 may, for example, establish one or more contractual relationships between load centers 116a and generation sources 116b. In some cases, processor 104 may populate a contract specifying the terms of energy supply, including the amount of energy, time of delivery, type of energy (renewable, non-renewable, carbon-free, or non-carbon-free), pricing, among others. As a non-limiting example, aligning each load center of plurality of load centers 116a to one or more generation source of plurality of generation sources 116b may include generating one or more energy programs as a function of plurality of energy datasets 120, wherein each energy program may specify which generation sources may supply energy to which load centers under which set of contractual terms. In some cases, one or more machine learning models as described in further detail below may be used to determine such alignment between load centers and generation sources. In some embodiments, processor 104 may be configured to determine, for each load center of plurality of load centers 116a, one or more generation sources of plurality of generation sources 116b that may contribute generation to each load center as a function of business rules (e.g., "which energy program is the customer subscribed?"), a geographic location (e.g., "which state does the customer reside in?"), regulatory requirements (e.g., "what is the minimum vintage date for generators to qualify as additional to the grid and thus have their generation be matched?"), and the like.

With continued reference to FIG. 1, processor 104 is configured to match, using a matching engine 140, each load center of plurality of load centers 116a to one or more generation source of the generation sources 116b as a function of the plurality of energy datasets 120. As used in this disclosure, a "matching engine" is a software system designed to align or pair datasets from different sources based on one or more predefined criteria and algorithms to match energy consumption data from plurality of load centers 116a with energy generation data from plurality of generation sources 116b within grid network 112. Matching engine 140 may identify, for each load center of plurality of load centers 116a one or more generation sources 116b, characterized by energy datasets 120 (e.g., energy output and other attributes as described herein), based on, for example, energy load data 136 as described above. In some cases, energy load data 136 may be retrieved, for example, and without limitation, from one or more integrated customer information systems (CIS) or energy management systems (EMS) through one or more APIs (e.g., RESTful or SOAP-based web services) configured to allow matching engine 140 to query retrieve energy load data 136 from aforementioned systems and any other third-party data provides. Such data transmission may be in real-time; for instance, and without limitation, energy load data 136 may be transmitted in a continuous manner, using technologies such as MQTT, Kafa, or any other streaming platforms, to matching engine 140. In other cases, energy load data 136 may be manually uploaded, at each of the plurality of load centers 116a, to processor 104. As a non-limiting example, users e.g., utilities may provide energy load data in the form of spreadsheets or reports which can be manually ingested into system 100. In other embodiments, grid monitoring devices may further include one or more IoT sensors deployed at various points within grid network 112 configured to provide, for example, additional data on the energy load.

With continued reference to FIG. 1, in some cases, energy load data 136 may be processed, and one or more data features e.g., energy output, fuel type, emission data, and the like may be identified, prior to the match of two sets of nodes 116a-b. In an embodiment, matching engine 146 may be configured to implement one or more matching algorithms designed to match energy load data 136 received from plurality of load centers 116a to plurality of energy datasets 120 collected from generation sources 116b. As a non-limiting example, processor 104 may define one or more criteria for matching, such as minimizing emissions, balancing load and generation, maximizing the use of renewable energy, cost optimization, or any combinations thereof. For instance, and without limitation, criteria may be set by a user. Matching engine 140 may be configured to prioritize matching, for selected criteria related to "minimizing emissions," plurality of load centers 116a to renewable energy sources to reduce overall emissions, or in other cases, ensure that the energy supply at generation sources 116b meet the demand of plurality of load centers 116a without significant overproduction or underproduction based on "balancing load and generation" criteria.

With continued reference to FIG. 1, in one or more embodiments, matching plurality of load centers 116a and plurality of generation sources 116b may include correlating energy load data 136 (collected from load centers) with set of energy attribute records 128 (collected from generation sources). As a non-limiting example, a residential node A may be matched with solar farm node X for midday consumption and wind farm node Y for evening consumption when wind conditions are favorable. As another non-limiting example, commercial node B may be matched with solar farm node X during business hours and supplemented with wind farm Y as needed. In some cases, matching engine 140 may be configured to evaluate the remaining load that cannot be met by generation sources 116b, in particular, renewable energy sources. In some cases, matching engine 140 may match, for example, any remaining load with non-renewable energy sources.

With continued reference to FIG. 1, in some cases, matches between plurality of load centers 116a and plurality of generation sources 116b may be validated to ensure grid network 112 meet the required criteria and constraints, and may be dynamically adjusted, by matching engine 140 based on new energy load data and/or energy datasets or changing conditions within grid network 112. As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation, matches of each load center of plurality of load centers 116a to one or more generation sources of plurality of generation sources 116b, against a specification. As a non-limiting example, matches may be validated to ensure the energy load is balanced and renewable energy usage is maximized against a predetermined balance and/or usage threshold. In some cases, processor 104 may be additionally configured to validate a product by validating constituent sub-products. In some cases, machine-learning process, for example a machine-learning model, may be used to validate matches at matching engine 140 by processor 104. Matching engine 140 may use any machine-learning process described in this disclosure for this or any other function. In some cases, matches may be intelligently adjusted to optimize, for example, and without limitation, the cost and emissions, potentially incorporating time-of-use pricing data, using one or more machine-learning process.

With continued reference to FIG. 1, processor 104 is then configured to generate, for each load center of plurality of load centers 116a, a plurality of actionable energy models 144 as a function of the energy load data of each load center of plurality of load centers 116a. As used in this disclosure, an "actionable energy model" is a configurable framework designed to manage at least an alignment between a load center and one or more generation sources. Actionable energy model includes a configurable allocation of set of energy attribute records 128. In an embodiment, configurable allocation of set of energy attribute records 128 may include a dynamic and configurable assignment of specific energy attributes (or energy attribute certificates) to meet, for example, the energy demands or consumptions of load centers. In some cases, configurable allocation may include a contractual relationship established based on aforementioned alignment between load center and generation sources, wherein the contractual relationship, for example, at least in part, may be configurable.

With continued reference to FIG. 1, in some cases, system 100 as described herein may include an energy management system. Each actionable energy model of plurality of actionable energy models 144 include a configurable allocation of plurality of energy attribute records 128 to match, for example, and without limitation, energy load data e.g., energy consumption data such as current data on energy consumption across different nodes in grid networks 112, past data on energy consumption (including consumption patterns, peak demand periods, and seasonal usage trends), and/or even forecasted energy demand based on the past and current data, with energy datasets e.g., energy generation data such as current/historical energy production, type of energy sources, production variations, and/or performance metrics or vice versa, optimizing for criteria such as emission reduction, cost efficiency, renewable energy utilization, among others. Processor is configured to match each load center of plurality of load centers 116a to one or more generation sources within plurality of generation sources 116b as a function of at least one actionable energy model of plurality of actionable energy models 144.

With continued reference to FIG. 1, in some embodiments, each actionable energy model of plurality of actionable energy models 144 may balance an energy load distribution across grid network 112, for example, and without limitation, between one or more load centers of plurality of load centers 116a and one or more generation sources of plurality of generation sources 116b, to ensure energy supply meets demand while minimizing losses. In one or more embodiments, each actionable energy model may allow users to define and adjust parameters based on specific needs and goals, for example, and without limitation, emission reduction targets, energy load, budget, and the like. In some cases, different actionable energy models may support creation and evaluation of different operational scenarios for stakeholders to explore, for instance, potential impacts of various energy supply decisions. As a non-limiting example, each actionable energy model of plurality of actionable energy models 144 may be implemented, in some cases, as energy programs which provide structured frameworks for managing and optimizing energy resources within grid network 112 to achieve utilities' goals. In some cases, each actionable energy model of plurality of actionable energy model may include one or more pre-defined relationship between, for example, and without limitation, generators and customers. In some cases, actionable energy models may include an hourly program, daily program, weekly program, monthly program, quarterly program, or yearly program. For example, and without limitation, a utility company may use an actionable energy model to manage its operations through an energy program incorporated by the actionable energy model. As a non-limiting example, configurable allocation of set of energy attribute records 128 may include a configurable assignment of plurality of energy attribute certificates generated from set of energy attribute records 128 as described above. The assignment of plurality of energy attribute certificates being "configurable," for the purpose of this disclosure, means the ability to adjust, modify, or customize the actionable energy model's parameters and criteria. In some cases, allocation of set of energy attribute records 128 may be subsequently adjusted based on, for example, and without limitation, user's specific needs e.g., user preferences or different selections or configurations of alignment (i.e., programs) within grid network 112.

With continued reference to FIG. 1, in some cases, plurality of actionable energy models 144, for a load center, may be generated based on the alignment between the load center and one or more generation sources of plurality of generation sources 116b. As a non-limiting example, matching engine 140 may ingest both energy load data 136, such as, without limitation, energy consumption data from the load center, and set of energy attribute records 128, e.g., energy generation data and/or energy attribute certificates 132 from generation sources 116b, match energy consumption data to energy generation data and/or energy attribute records 128 using one or more predefined criteria e.g., minimizing emissions, balancing load and generation, maximizing renewable energy utilization, and/or the like, and then generate, at processor 104, one or more actionable energy models that provide, for instance, a desired allocation of energy attribute records. In some cases, each actionable energy model may include detailed insights and actionable information to optimize energy management for utilities. For example, each actionable energy model may include matched energy profiles, for each load center of plurality of load centers 116a, showing the sources of their energy consumption including, without limitation, proportion of renewable, non-renewable, carbon-free, and non-carbon-free energy. Each actionable energy model may also include an energy attribute records assignment, for example, and without limitation, assignment of RECs to match energy consumption or at least a portion of energy consumption predefined by utilities or system 100.

With continued reference to FIG. 1, in some cases, emission value 124 may be integral to the generation of plurality of actionable energy models 144. In some cases, processor 104 may calculate, for each matched energy profile, one or more emission values associated with one or more matched generation sources. Exemplary embodiments of emissions may include, as described herein and without limitation, CO2 emissions, methane, and any other relevant pollutants. Matching engine 140 may be configured to apply calculated emission value 124 to each energy dataset of plurality of datasets 120 (e.g., type of fuel, generation technology, and/or the like) to compute, for example, total emissions for energy consumed. In some cases, derived emission data may be included in each actionable energy model of plurality of energy models 144 to indicate environmental impact associated with each actionable energy model. In other cases, the use of emission data as described herein may enable system 100 to automatically adjust matching algorithms and process executed by matching engine 140; for example, and without limitation, matching engine 140 may be configured to prioritize plurality of generation sources 116b with lower emissions to reduce an overall carbon footprint.

With continued reference to FIG. 1, in an embodiment, matching engine 140 may be implemented, without limitation, as a rule engine. As used in this disclosure, a "rule engine" is a module or a software system designed to process and apply a set of predefined rules to data inputs to derive one or more conclusions. In some cases, system 100 may use derived conclusions to, for example, make one or more decisions or trigger one or more system actions. In an embodiment, processor 104 may implement, for instance, a rule engine to apply one or more specific rules to match energy load data 136 with plurality of energy datasets 120. A set of "predefined rules," for the purpose of this disclosure, is a collection of pre-determined conditional statements or business logic that dictate how the input data should be processed. In an embodiment, rules may be expressed in the form of "if-then" statements. Rule engine may include an inference engine implementing forward chaining (i.e., a data-driven approach where rule engine starts with known data and applies rules to infer new data or conclusions), or alternatively, backward chaining (i.e., a goal-driven approach where the rule engine starts with a goal and works backward to determine what data is needed to achieve that goal). In some embodiments, data inputs e.g., energy load data 136, plurality of energy datasets 120, and/or intermediate match result may be stored in memory 108. In some cases, rule engine may use memory 108 to match facts against rules. In some cases, energy load data 136 and set of energy attribute records 128 may be used as initial set of data for rule engine. Rule engine may compare data inputs, for example, and without limitation, facts against rules in a rule base and perform one or more actions specified by rules e.g., updating data, generating outputs, or triggering external processes upon a match between the facts and specified conditions. As a non-limiting example, rule base may include a rule e.g., "if the energy load occurs during peak solar generation hours e.g., 10 AM to 4 PM, then match the load with solar generation data." Inference engine may use forward chaining to apply the rule to energy load data and energy datasets by comparing energy load data (e.g., load data indicating a high consumption at 12 PM) against the rule and match energy load data with energy datasets (for example, match the load with a solar farm with minimal emissions), and generate one or more actionable energy models that includes matched energy profiles for each load center.

With continued reference to FIG. 1, in one or more embodiments, processor 104 may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference FIG. 1, processor 104 may be configured to use a machine learning module to implement one or more algorithms or generate one or more machine-learning models to determine, for example, alignment between load center and generation sources and plurality of actionable energy models 144. However, the machine-learning module is exemplary and may not be necessary to generate one or more machine-learning models and perform any machine-learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as inventory described below with reference to FIG. 2 or be provided by utilities. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Educational machine-learning module 136 may be used to generate educational obstacle machine-learning model 140 and/or any other machine-learning model, such as educational obstacle classifier, educational action machine-learning model described below, using training data.

With continued reference to FIG. 1, in an embodiment, processor 104 may be configured to train a machine learning model 148 using energy training data 150, wherein the energy training data 150 may include examples of energy datasets as input correlated to designations of generation source as output. As used in this disclosure, a "designation of generation source" refers to a specific assignment or selection of a generations source (e.g., energy-generating node) that is identified to supply energy to particular load center. In some cases, energy training data 150 may be iteratively updated as a function of the input and output results of past machine-learning model 148 or any other machine-learning model mentioned throughout this disclosure. Processor 104 may then determine, using the trained machine learning model 148, one or more designations of generation source as a function of energy load data 136. Plurality of actionable energy models 144 may be generated, by processor 104, based on one or more designations of generation sources. Alternatively, machine learning model 148 may be trained to directly generate plurality of actionable energy models 144. In this case, energy training data may include a plurality of energy datasets as input correlated to, for example, and without limitation, a plurality of actionable energy models as output. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, in some cases, matching each load center of plurality of load centers 116a to one or more generation sources of plurality of generation sources 116b may include identifying, for each actionable energy model of plurality of actionable energy models 144, a priority order 152 as a function of the energy load data. As described herein, a "priority order" is a hierarchical arrangement that dictates the preference of plurality of actionable energy models 144. Processor 104 may rank, based on identified priority order 152, plurality of actionable energy models 144, enabling system 100 to determine, for example, which model may be considered first when matching load centers and generation sources. In one or more embodiments, system 100 may assign priority order 152, such as, without limitation, a numeric value (e.g., 0~100) or a classification (e.g., "low," "medium," and "high") representing a relative importance, determined based on specific criteria or set of rules as described above. As a non-limiting example, if the primary goal of utilities is to minimize emissions, then matching engine 140 may prioritize models that reduce greenhouse gas emissions. Such priority order may be determined based on emission value 124; for instance, a higher priority order may be assigned to one actionable energy model with a lower emission value compared to another actionable energy model with a higher emission value. Processor 104 may select a range of actionable energy models having high priority orders and match, in some cases, each load center of plurality of load centers 116a to one or more generation sources of plurality of generation sources 116b as a function of at least one highest ranked actionable energy model of plurality of actionable energy models 144. In some cases, one or more machine learning models may be generated to determine priority order 152 for each actionable energy model of plurality of actionable energy models 144.

With continued reference to FIG. 1, as a non-limiting example, processor 104 may be configured to allocate a portion of plurality of energy attribute certificates to each load center of plurality of load centers 116a upon an automatic execution of at least one actionable energy model (e.g., configurable allocation of set of energy attribute records). As used in this disclosure, "allocate" means to distribute or assign a portion of resource, in this case, energy attribute records 128, to one or more specific entities or nodes based on a set of instructions. In some cases, at least one actionable energy model may include, for example, a set of pre-defined rules regarding allocation of plurality of energy attribute records 128. As a non-limiting example, allocation as described herein may involve determining an appropriate amount of energy attribute certificates that should be assigned to each load center based on corresponding energy load data 136 (e.g., energy need and/or consumption pattern). In one or more embodiments, at least one actionable energy model may be pre-selected; for instance, and without limitation, plurality of actionable energy models 144 may include a default, system generated actionable energy model for standard ratepayers (i.e., those customers not participating in any of the clean energy programs). In some cases, users may manually select a preferred actionable energy model based the energy need for daily, weekly, monthly, quarterly, or yearly operations. In other embodiments, system 100 may automatically select, on behalf of the user, a desired actionable energy model among plurality of actionable energy models 144 based on pre-defined user preferences or priority order 152 as described above.

With continued reference to FIG. 1, in some cases, allocating portion of plurality of energy attribute records 128 may include identifying, as a function of at least one actionable energy model, portion of plurality of energy attribute records 128. In some embodiments, portion of plurality of energy attribute certificates 132 may include, without limitation, renewable energy certificates, non-renewable energy certificates, carbon-free energy certificates, and non-carbon-free energy certificates, and distribute calculated portion of energy attribute certificates 132 to each load center. In some cases, each actionable energy model of plurality actionable energy models 144 may include a designation of reserved, subscribed renewable energy generation. System 100, specifically processor 104, may carry out execution, for example applying at least one actionable energy model, without the need for any manual intervention, to assign plurality of energy attribute certificates 132 based on the alignment. As a non-limiting example, each actionable energy model of plurality of actionable energy models 144 may include a configurable allocation containing a schema outlining how plurality of energy attribute certificates 132 should be allocated to one or more load centers. As a non-limiting example, system 100 may intelligently distribute the allocated energy attribute certificates 132 to each load center of plurality of load centers 116a based on their energy load data 136 and matched one or more generation sources of plurality of generation sources 116b. In some cases, allocation of energy attribute certificates 132 may be performed simultaneously, for example, and without limitation, with alignment or matching between load centers and generations sources. Additionally, or alternatively, system 100 may continuously monitor, for example, using grid monitoring devices as described above to monitor and adjust allocation of set of energy attribute records 128 in real-time or near real-time to reflect changes in energy load data 136 and plurality of energy datasets 120.

With continued reference to FIG. 1, as a non-limiting example, residential node A may have a high energy load at noon. Matching engine 140 may generate an actionable energy model that prioritizes minimizing emissions and maximizing renewable energy utilization, wherein the actionable energy model may determine residential node A should be allocated x amount of allocated energy attribute records from solar farm X, y amount of allocated energy attribute records from wind farm Y, and z amount of allocated energy attribute records from other non-renewable energy sources within grid network 112. The specific amount of energy attribute records may be determined, as described above, using one or more machine learning models trained on energy training data 150. In some cases, system 100 or users (at residential node A) may be able to subsequently update, for example, and without limitation, one or more parameters of actionable energy model e.g., the amount of energy attribute records should be allocated to the node A, matched energy generation sources (e.g., matched generation sources), or any other allocation settings based on user preferences or changes in energy load data and/or energy datasets.

With continued reference to FIG. 1, in some cases, allocation of the plurality of energy attribute records 128 as described herein may be on an hourly basis. As a non-limiting example, allocation of energy attribute records may be performed, by processor 104, at hourly intervals. For each hour, system 100 may identify an appropriate portion of energy attribute records of plurality of energy attribute records 128 to be allocated to each load center of plurality of load centers 116a based on their energy consumption and matched generation sources in grid network and distribute the portion of energy attribute records of plurality of energy attribute records 128 to each load center. In an embodiment, plurality of energy attribute certificates 132 may include one or more granular certificates, wherein the "granular certificates," also called "hourly RECs" or time-based energy attribute certificates (T-EACs), as described herein, are certificates that track specific renewable energy generation on an hourly basis. Such granular certificates may provide a high level of precision in matching energy consumption with generation thereby reducing waste and improving efficiency in energy management, enhancing the system's ability to balance supply and demand, and providing a more accurate tracking and reduction of emissions. In some cases, each one of the plurality of load centers 116a may be allocated, at different hours, different amount e.g., MWh of electricity. It should be noted that the allocation as described herein may be independent of time interval. Allocation of set of energy attribute records 128 may be hourly, sub-hourly, monthly, or annually.

With continued reference to FIG. 1, as another non-limiting example, allocating energy attribute records 128 may include reserving subscribed generation for clean energy programs and removing subscribed generation and load from inventory (as described below with reference to FIG. 2). Processor 104 may then allocate, for example, all owned carbon free energy of utilities, PPA carbon-free energy (i.e., carbon-free energy purchased through power purchase agreements), null power, and pool the remaining non-carbon free energy to match the requested energy load. In some embodiments, allocating portion of plurality of energy attribute records 128 may include identifying, for each load center of plurality of load centers 116a, a tradable residual energy delivery mix as a function of the energy load data and the at least one actionable energy model. As used in this disclosure, a "tradable residual energy delivery mix" is a portion of energy attribute records that remains unallocated or unmatched after primary allocation of energy attribute records to load centers (as described above). As a non-limiting example, if energy generation is greater than energy load (in an hour), then there is no "residual." In this case, a default actionable energy model using, for example, regional fossil-only rate per CRS guidance, which is consistent with fossil-only blend that would have been in the residual energy delivery mix. In some cases, tradable residual energy delivery mix may be characterized by its ability to be traded (or sold) in energy market. In one embodiment, tradable residual energy delivery mix may include a blended collection of energy attribute records; for example, and without limitation, this may include renewable energy, non-renewable energy, or a mix of both depending on the initial allocation. As a non-limiting example, residual energy delivery mix may be associated with one or more RECs or other tradable certificates that certify environmental attribute of the energy, and residual energy delivery mix may be sold or traded in between plurality of load centers 116a or utilities, either as physical energy or as financial instruments. In some cases, processor 104 may be configured to calculate, for each node of plurality of load centers 116a, a total amount and composition of the residual energy delivery mix by subtracting, for example, and without limitation, subscribed (i.e., initially allocated) energy attribute records from inventory associated with each node. This is described in further detail below with reference to FIGS. 4A-C.

With continued reference to FIG. 1, processor 104 is configured to populate an allocation report 156 for each load center of plurality of load centers 116a within grid network 112 as a function of allocation of plurality of energy attribute records 128. As used in this disclosure, an "allocation report" is a dynamic representation of energy consumption of load center and generation characteristics of matched generation source over specific time intervals within grid network 112. In some cases, allocation report 156 may include a plurality of attributes related to, for example, without limitation, energy usage, production, environmental impact, and/or the like. As a non-limiting example, allocation report may include one or more visualizations of the at least one actionable energy model containing detailed energy consumption and generation data captured on hourly basis. As used in this disclosure, a "visualization" of at least one actionable energy model refers to a visual representation of data and information related to the at least one actionable energy model. As a non-limiting example, visualization of at least one actionable energy model may include a graphical representation of an energy attribute records allocation as described in further detail below with reference to FIG. 6. In some cases, data may be aggregated over longer time intervals. Visualization may also illustrate, for example, without limitation, current energy usage data for each node within grid network 112 including both plurality of load centers 116a and generation sources 116b. In some cases, generating allocation report 156 may include identifying one or more past energy usage patterns (e.g., for trend analysis and long-term planning). In an embodiment, one or more machine-learning models may be trained to generate allocation reports 156 based on energy attribute record allocations. System 100 may implement forecasting capabilities to predict energy demand based on identified past energy usage patterns, weather forecasts, and other relevant factors. In one or more embodiments, allocation report 156 may provide real-time insights into energy consumption and generation across grid network 112, allowing users to immediate responses to events e.g., changes in demand and supply. Additionally, or alternatively, allocation report 156 may be configurable; for instance, and without limitation, allocation report 156 may allow users to dynamically adjust the distribution of energy across grid network 112. In some cases, system 100 may permit user to reallocate, based on allocation report 156 and a second criteria, plurality of energy attribute certificates 132 to prioritizing different goals. Further, allocation report 156 may be configured to track emissions associated with allocated portion of plurality of energy attribute certificates 132. As a non-limiting example, allocation report 156 may include one or more reports on energy consumption and generation, current and past energy attribute records allocation, sustainability metrics, supporting transparency and accountability in environmental performance, and/or the like. Such reports may support, for example, and without limitation, system evaluation of different operational scenarios, helping stakeholders make informed, data-driven decisions on energy management strategies. An exemplary embodiment of a visualization of actionable energy model may include, without limitation, an interactive dashboard containing a plurality of visual components such as textual report, graphs (e.g., histograms, scatter plots, and pie chart), or links to the plurality of visual components.

With continued reference to FIG. 1, processor 104 is configured to transmit populated allocation report 156 to an external device 160 in communication with processor 104. As In one or more embodiment, an "external device" refers to any downstream system, device, or platform that received populated allocation report for further processing, displaying, analysis, and/or action. In some cases, exemplary embodiments of external devices may include, without limitation, a display device, a reporting tool, a customer portal, or other energy management systems. In some cases, allocation report 156 may be compiled and formatted, by processor 104, in a standard structure e.g., XML, JSON, CSV, DOCX, XLSX, or any other industry-standard data formats to ensure compatibility with various downstream devices. In one or more embodiments, any secure digital communication protocols e.g., HTTPS, MQTT, AMQP, SFTP, or the like may be used to transmit allocation report 156 to external device 160. In some cases, processor 104 may interface with network communication hardware e.g., ethernet, Wi-Fi, cellular networks, or any other wired and wireless communication technologies to transmit allocation report 156. As a non-limiting example, processor 104 may transmit allocation report 156 over an established secure communication channel. Once external device successfully received the allocation report, a response e.g., acknowledgement receipt may be sent back, from external device to processor 104 through the secure communication channel, to confirm the successful delivery and integrity of the received report. Additionally, or alternatively, allocation report 156 may be encrypted during data transmission to protect sensitive information e.g., set of energy attribute records 128 and energy load data 136 from unauthorized access or tampering. In some cases, upon receipt, external device 160 may integrate allocation report 156 into its respective system for further processing; for instance, and without limitation, external device 160 may include a portable user device e.g., laptop or smartphone having a customer portal installed, allowing a digital copy of allocation report 156 to be retrieved at client side.

With continued reference to FIG. 1, processor 104 may display, at a display device, populated allocation report 156 using a user interface. As used in the current disclosure, a "display device" is a device that is used to display a plurality of data and other digital content. A display device may include user interface. A "user interface," as used herein, is a means by which a user and a computer system interact, for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
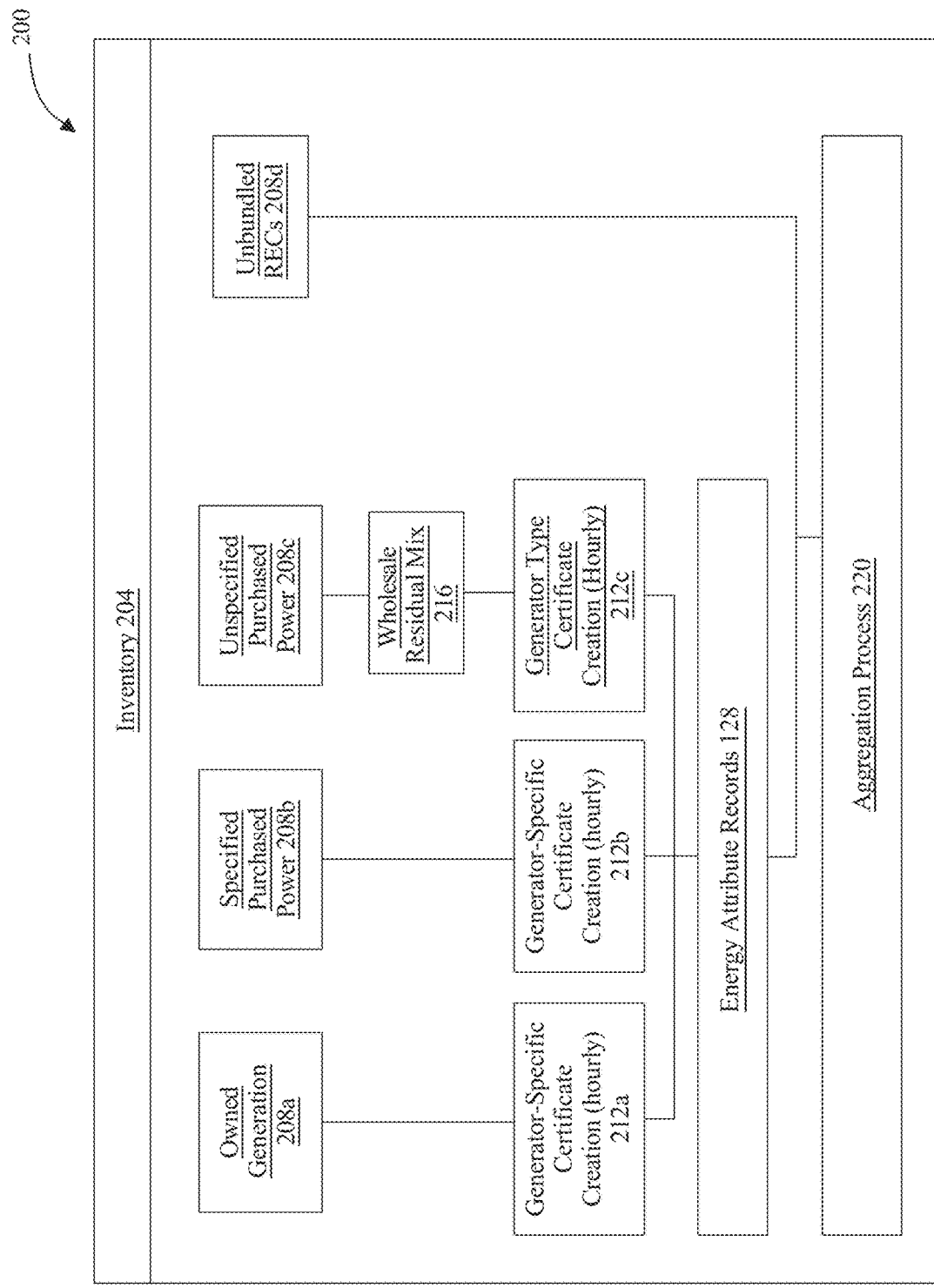
FIG. 2 is an exemplary embodiment of an inventory profile.

Now referring to FIG. 2, an exemplary embodiment of an inventory profile 200 is illustrated. In an embodiment, system 100 may be configured to establish an inventory 204 i.e., database of plurality of energy datasets 120 and/or energy attribute records 128. As a non-limiting example, system 100 may implement a datastore configured to store plurality of energy datasets 120 and/or energy attribute records 128, such as, without limitation, as a relational database, a key-value retrieval datastore such as a NOSQL database, or any other format or structure for use as a datastore that a person skilled in the art would recognize as suitable upon review of the entirety of this disclosure. Inventory 204 may include a plurality of data entries and/or records corresponding to energy datasets 120 and/or energy attribute records 128 as described above.

With continued reference to FIG. 2, in some cases, data entries in inventory 204 may be flagged with or linked to one or more additional elements of information, which may be reflected in data entry cells and/or in linked tables such as tables related by one or more indices in a relational database. In some embodiments, inventory 204 may be located in memory 108 and/or on another device in and/or in communication with apparatus 100, for example, and without limitation, as a cache database. For instance, and without limitation, plurality of energy datasets 120 may be listed in records describing quantities in of energy e.g., electricity generated by a generation source e.g., a generator and/or category of fuel, in megawatts per hour, percentage and/or proportion of total electricity flowing through grid network 112 of each quantity produced by each generator, a date and/or time or similar timestamp of recording of quantity of each electricity output, a unique identifier of the generator, or the like.

With a continued reference to FIG. 2, as a non-limiting example, inventory 204 may integrate data from different energy sources 208a-d. Energy sources 208a-d may include owned generation (i.e., energy generated by utility's own facilities), specified purchased power (i.e., energy purchased through power purchase agreements [PPAs] where the generation source is known), unspecified purchased power (i.e., energy purchased from the wholesale market where the specific generation source is not specified), and unbundled RECs (i.e., renewable energy certificates purchased separately from actual energy). Inventory 204 may be configured, as described above with reference to FIG. 1, generate one or more energy attribute record 128 or energy attribute certificates 132 via one or more certificate generation processes 212a-c; for example, and for both owned generation and specified purchase power, system 100 may create, without limitation, a plurality of energy attribute certificates that are specific to the generating facility and may be, in some cases, recorded on an hourly basis (212a). As another non-limiting example, for unspecific purchased power, system 100 may create a plurality of energy attribute certificates based on the type of generator and records these hourly (212b). In other embodiments, unspecified purchased power may be also, for example, at least in part, tracked as part of a wholesale residual mix 216 (i.e., tradable residual energy delivery mix).

With continued reference to FIG. 2, all generated energy attribute records 128 or energy attribute certificates 132 (both generator-specific and type-specific) may be, for example, aggregated into at least a portion of inventory 204a managed, in some cases, on an hourly basis. In some embodiments, inventory 204 may integrate third-party certificate inventory; for instance, and without limitation, Duke Energy certificate inventory that tracks all energy certificates created from various sources managed by Duke Energy. In some cases, hourly certificates may be aggregated on an annual or monthly basis. In an embodiment, inventory 204 may initiate an aggregation process 220 that consolidates, for example, a plurality of portions of inventory 204a containing hourly data into larger time periods, or a second portion of inventory 204b e.g., an annual or monthly certificate inventory, for more manageable tracking and reporting. In some cases, unbundled RECs (i.e., REC sold separately from underlying energy) may be added to the at least a portion inventory 204a if hourly production data is available. As a person skilled in the art, upon reviewing the entirety of this disclosure, will recognize the importance of precise tracking of energy generation and consumption using inventory 204, and its support to verification and trading of energy attribute records, contributing to a more efficient and sustainable energy market.

Figure 3:
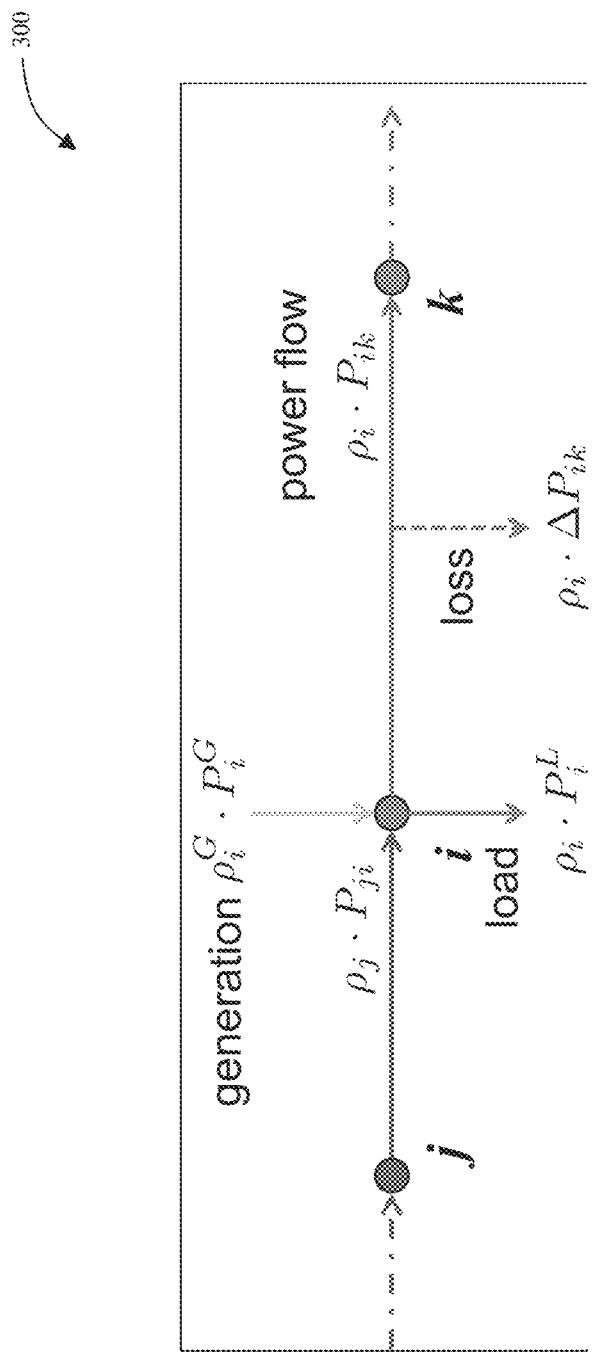
FIG. 3 is an illustrative example of an emission value calculation.

Referring now to FIG. 3, in an illustrative example 300, an emission value e.g., a carbon emission flow associated with an energy dataset e.g., a power flow, is described as below.

$$\text{Objective:} \min_{x \in X} C_{power}(x, y) + C_{carbon}(x, y, z)$$

$$\text{Power Flow Equations } (x, y) = 0$$

$$\text{Power Flow Constraints } (y) \leq 0$$

$$\text{Carbon Flow Equations } (x, y, z) = 0$$

$$\text{Carbon Flow Constraints } (z) \leq 0.$$

In this example, which is a carbon flow integrated optimal power flow (OPF), x denotes the decision variables that are subject to the feasible set X. The specification of x and X depends on the practical applications. For example, x can be the generations of power plants in economic dispatch, or the reactive power of static Var compensators in Var-Volt optimization, described in some detail in FIG. 1, or the site and size decisions of new renewable generation units in expansion planning, etc. y denotes the power flow-related variables, such as the nodal voltage profiles and branch power flows. z denotes the carbon flow-related variables, including the nodal carbon intensities ρ and carbon flow rates R, etc. Consider a power network described by a connected graph G(N,E), where N denotes the set of buses and E denotes the set of branches. Consider a power network described by a connected graph G(N,E), where N denotes the set of buses and E denotes the set of branches. For each node i, its nodal carbon intensity based on and/or relating to a carbon emission in grid network 112 is $$\rho i = \frac{\sum k \in G_i \rho_{i,k}^G P_{i,k}^G + \sum j \in N_i^+ \rho_j P_{ji}}{\sum k \in G_i P_{i,k}^G + \sum j \in N_i^+ P_{ji}}, i \in N$$

Where $P_{i,k}^G$ denotes the active generation power of k-th generator at node i, $\rho_{i,k}^G$ is the associated generation carbon emission intensity, and $G_i$ denotes the set of generators at node i. $P_{ji}$ is the active power flow from node j to node i and is the value at the receiving node i. $P_{ji}+\Delta P_{ji}$ is the power flow value at the sending node j, where $\Delta P_{ji}$ is the power loss of branch ji∈E. N+ is the set of neighbor nodes that send power to node i. In the equation above, there are two key assumptions or principles for constructing the carbon flow model. One is the proportional sharing principle that is generally applied in the power flow tracing studies, since all power out-flows (including loads) from node i have the same carbon intensity $\rho_i$, and thus the nodal carbon emission injections are allocated to them in proportion to their power flow values. The other assumption is that the branch carbon intensity $\rho_{ji}$ is the same for the power flow $P_{ji}$ over this branch ji∈E, also for the power loss $\Delta P_{ji}$, and equals to the nodal carbon intensity of the sending bus, i.e., $\rho_{ji}=\rho_j$. In this way, the carbon emissions per unit time that are attributed to a load $P_i^L$ is calculated by $R_i^L=\rho_i \cdot P_i^L$, and the emission amount that is attributed to the power network loss may be given by $$R_{loss} = \sum_{ji\in\varepsilon} \rho j * \Delta P_{ji}$$

FIG. 3 illustrates the carbon flow values associated with generation, load, and branch flow. The carbon flow equation above may be reformulated in a matrix form as:

$$\rho = (P_{in} - P_B)^{-1} PG\rho G$$

where $\rho:=(\rho_i) i\in N \in \mathbb{R}^N$ and $\rho G:=(\rho_{i,k}^G) k\in G_i, i\in N \in \mathbb{R}^{N_G}$ are column vectors that collect the nodal carbon intensities and generation carbon intensities, respectively. $PG\in \mathbb{R}^{N\times N_G}$ is the generation power matrix that is constructed by taking $P_{i,k}^G$ as the entry at i-th row and k-column (k is the corresponding index in vector $\rho G$) for all $k\in G_i$ and $i\in N$, while the rest entries of PG are all zero. $P_{in}:=\text{diag}(\Sigma k\in G_i\ P_{i,k}^G+\Sigma j\in N_i^+ P_{ji})\in \mathbb{R}^{N\times N}$ is the diagonal matrix whose i-th diagonal entry is the total power injection to node i. $PB\in \mathbb{R}^{N\times N}$ is the power inflow matrix with $PB[i,j]=P_{ji}$ and $PB[j,i]=0$ if node j sends power flow $P_{ji}$ to node i.

With continued reference to FIG. 3, the equation $$\min_{x\in X} C_{power}(x, y) + C_{carbon}(x, y, z)$$

aims to minimize the total cost that consists of the power-related cost $C_{power}$ and the carbon emission-related cost $C_{carbon}$. Depending on the practical problems, $C_{power}$ can be the generation cost, network loss, or grid expansion investment cost, etc. $C_{carbon}$ denotes the penalty cost on carbon emissions, which can be either on the generation side or the consumption side, or both. An example of these cost functions is given by:

$$C_{power} := \sum_{i\in N}\sum_{k\in G_i} c_{i,k,2} P_{i,k}^{G^2} + c_{i,k,1} P_{i,k}^G + c_{i,k,0}$$

-continued $$C_{carbon} := c_{CO_2} * \sum_{i\in N}\sum_{k\in G_i} \rho_{i,k}^G P_{i,k}^G$$

Where $C_{power}$ denotes the total quadratic generation cost with the coefficients $\{c_{i,k,2}, c_{i,k,1}, c_{i,k,0}\}$, and $C_{carbon}$ is the penalty on generation-side emissions with the cost coefficient $C_{CO_2}$.

Continuing to refer to FIG. 3, in this exemplary embodiment, "Power Flow Equations (x, y)=0" denotes the power flow equations and "Power Flow Constraints (y)≤0" describes the power flow constraints, such as the voltage limits and line thermal constraints. These are the same as in the conventional OPF models. For example, the classic DC power flow model is widely used in OPF problems where the power flow equations and the power flow constraints are shown below.

$$P_i^L = \sum_{j\in N_i} P_{ji} + \sum_{k\in G_i} P_{i,k}^G\ i \in N$$

$$P_{ji} = B_{ji}(\theta_j - \theta_i)\ ji \in \varepsilon$$

$$-\overline{P}_{ji} \le P_{ji} \le \overline{P}_{ji}$$

Here, Ni denotes the set of neighbor nodes of node i. Bji is the susceptance of power line ji, θi is the phase angle of bus i, and Pji is the line transmission capacity. In an embodiment, each power flow constraint may be used in the optimization process as described in FIG. 1.

Still referring to FIG. 3, the carbon flow equation, Carbon Flow Equations (x, y, z)=0, may be formulated as $$\rho_i\left(\sum_{k\in G_i} P_{i,k}^G + \sum_{j\in N_i^+} P_{ji}\right) = \sum_{k\in G_i} \rho_{i,k}^G P_{i,k}^G + \sum_{j\in N_i^+} \rho_j P_{ji}$$

for all $i\in N$. The carbon flow constraints, Carbon Flow Constraints (z)≤0, can take various forms according to practical requirements. For instance, an upper limit is imposed on the nodal carbon intensities as $\rho_i \le \overline{\rho}_i$, in an upper limit is imposed on the consumption-side carbon emissions of each load as $\rho_i \cdot p_i^L \le \overline{R}_i^L$, defines a fairness index on nodal carbon intensities and set a cap on it.

When the nodal loads $p_i^L$ are given parameters, $\rho_i \cdot p_i^L \le \overline{R}_i^L$ is equivalent to $\rho_i \le \overline{p}_i$ by setting $\overline{p}_i = \overline{R}_i/p_i^L \cdot \rho_i \in [0, \rho_{max}^G]$ due to the mix property of carbon flow, where $\rho_{max}^G := \max_{i,k}\{\rho_{i,k}^G\}$ is the largest generation emission intensity. If the upper limit $\overline{\rho}_i$ is larger than $\rho_{max}^G$ for certain node i imposes no constraint on $\rho_i$. The Carbon flow model, illustrated above, is a generalization of conventional OPF methods, which reduces to an OPF model if removing the carbon cost function, carbon flow equations and constraints. It indicates that all existing OPF techniques, such as linearization, convexification, decomposition, stochastic modeling, etc., can be applied to the power flow components in the carbon flow model. The Carbon flow model is also applicable to the multi-period optimization case with time-coupling constraints.

Continuing to refer to FIG. 3, in this exemplary embodiment, there are two key technical issues regarding the carbon flow equation when applying it to an optimization problem: the power flow direction and Bilinear terms. As indicated by the set N+, the carbon flow equation requires pre-determining the directions of all line power flows, to identify which are the in-flows for each bus. However, power flow directions are usually unknown before solving the carbon flow model problem. Generally, generations $P_{i,k}^G$ and power flows $P_{ji}$ are variables in the optimization problem, and the nodal carbon intensities 140 ($\rho i$)$i \in N$ are also variables. Therefore, there are bilinear terms in the carbon flow equation, such as $\rho_j P_{ji}$, making the carbon flow model nonlinear and nonconvex.

Still referring to FIG. 3, in an exemplary embodiment, the following potential solutions may address the issue. To address the power flow direction issue, instead of a single power flow variable, processor 104 creates two non-negative power flow variables $P_{ij} \geq 0$ and $P_{ji} \geq 0$ for each line $ij \in \varepsilon$. $P_{ij}$ and $P_{ji}$ are defined as the power flows from node i to node j and from node j to node i, respectively. Then processor 104 may modify the carbon flow equation to recite:

$$\rho_i \left( \sum_{k \in G_i} P_{i,k}^G + \sum_{j \in N_i} P_{ji} \right) = \sum_{k \in G_i} \rho_{i,k}^G P_{i,k}^G + \sum_{j \in N_i} \rho_j P_{ji},$$

$$0 \leq P_{ij}, 0 \leq P_{ji}, P_{ij} * P_{ji} = 0.$$

In the equation above, processor 104 may replace $N_i^+$ the set of neighbor nodes that send power to node i) by $N_i$ (the set of all neighbor nodes of node i. Moreover, the complementarity constraint $0 \leq P_{ij}$, $0 \leq P_{ji}$, $P_{ij} \cdot P_{ji} = 0$ is added to ensure either Pij or Pji must be zero. In this way, processor 104 may circumvent the need to pre-determine the directions of power flows without corrupting the carbon flow model. Each branch power flow variable in the power flow equations and constraints, e.g., Pji in the DC power flow model, is substituted by Pji−Pij. Alternatively, processor 104 may introduce a binary variable $\gamma_{ji} \in \{0,1\}$ for each line ji and replace the carbon flow equation by $$\rho_i \left( \sum_{k \in G_i} P_{i,k}^G + \sum_{j \in N_i} P_{ji} \right) = \sum_{k \in G_i} \rho_{i,k}^G P_{i,k}^G \sum_{j \in N_i} \rho_j P_{ji};$$

$$\gamma_{ji} \in \{0, 1\}, ji \in \varepsilon, 0 \leq Pij \leq \gamma ji M, 0 \leq Pji \leq (1 - \gamma ji) M$$

where M is a sufficiently large positive number, e.g., $M \geq \bar{P}_{ji}$. In this way, the use of binary variables circumvents the complementarity constraint $0 \leq P_{ij}, 0 \leq P_{ji}$, $P_{ij} * P_{ji} = 0$. In an embodiment, both the equations above may be equivalent reformulations of the original carbon flow equation, and the equations may not require information about power flow direction. However, the equations above are nonconvex due to the complementarity constraint and binary variables. In some embodiments, each complementarity constraint may be used in the optimization process described in FIG. 1.

The bilinear terms in the carbon flow equation, result from the quotient $$\rho i = \frac{\sum k \in G_i \rho_{i,k}^G P_{i,k}^G + \sum j \in N_i^+ \rho_j P_{ji}}{\sum k \in G_i P_{i,k}^G + \sum j \in N_i^+ P_{ji}}, i \in N.$$

The nodal carbon intensity based on and/or relating to a carbon flow 140 $\rho$ can actually be uniquely determined by $$\rho = (P_{in} - PB)^{-1} PG \rho G$$

given the power flow and generation profile. In particular, when the carbon flow constraints take the form of $\rho i < \bar{\rho} i$, one can eliminate the nodal carbon intensity variable $\rho$ and equivalently rewrite carbon flow equation as $(P_{in} - PB)^{-1} PG \rho G \leq \bar{\rho}$, where $\bar{\rho} := (\bar{\rho} i) i \in N$. Constraint $(P_{in} - PB)^{-1} PG \rho G \leq \bar{\rho}$, is generally nonconvex due to the matrix inverse, which motivates us to consider the transformation that multiples Pin−PB to the both sides of $(Pin - PB)^{-1} PG \rho G \leq \bar{\rho}$, resulting in a new constraint $PG \rho G \leq (P_{in} - PB) \bar{\rho}$. Since the generation carbon intensities $\rho G$ and the upper bound $\bar{\rho}$ are given parameters, $PG \rho G \leq (P_{in} - PB) \bar{p}$ is actually a set of linear constraints, which is desirable for optimization. However, constraint $PG \rho G \leq (P_{in} - PB) \bar{\rho}$ may not be equivalent to constraint $(P_{in} - PB)^{-1} PG \rho G \leq \bar{\rho}$. In the following proposition on the relation between the two equations, the key to the proof is the fact that all entries of the matrix $(P_{in} Pin - PB)^{-1}$ are non-negative.

Continuing to refer to FIG. 3, in an exemplary proposition, in terms of the feasible set F1 and the feasible set F2, described below, F2 $\subseteq$ F1.

$$F1 := \{(PG, P_{in}, PB) \mid \text{Constraint } (P_{in} - PB)^{-1} PG \rho G \leq \bar{p}.$$

$$F2 := \{(PG, P_{in}, PB) \mid \text{Constraint } PG \rho G \leq (P_{in} - PB) \bar{\rho}.$$

Proposition 1 states that the second constraint is actually an inner approximation to the first constraint. Therefore, to substitute the original constraint with the linear constraint in the carbon flow model, the resultant optimal solutions must be feasible for the carbon flow model problem with the first constraint. By using both the reformulation and the inner approximation, the carbon flow equations and constraints become mixed integer linear constraints. If convex (linear) power flow equations and constraints are used, e.g., the DC flow model, the carbon flow model becomes a mixed integer convex (linear) programming problem, which can be solved efficiently via many available optimizers. In embodiments, and without limitation, each constraint above may be used by any optimization process described herein.

Still referring to FIG. 3, an exemplary embodiment of a carbon emissions model for energy storage is illustrated. Energy storage (ES) plays an important role in low-carbon grid operation, as it can charge when the grid is "clean" and discharge when the grid is "dirty." To facilitate the decarbonization operation of ES units, a virtual carbon emission model for ES and integrate it to the carbon flow model is proposed. Suppose that an ES unit is attached to node $i \in N$, the ES power model is given by:

$$0 \leq P_{i,t}^{ch} \leq (1 - \alpha i, t) \bar{P}_i^{ch}, 0 \leq P_{i,t}^{dc} \leq \alpha_{i,t} P_{i,t}^{dc}$$

$$Ei, t+1 = \kappa i Ei, t + \Delta t (\eta chi Pchi, t - 1 \eta dci P dci, t),$$

$$0 \leq Ei, t \leq \bar{E}i, \alpha i, t \in \{0, 1\},$$

where $P_{i,t}^{ch}$ and $P_{i,t}^{dc}$ are the charging power and discharging power at time t, respectively. The binary variable $\alpha_{i,t}$ is used to enforce that an ES unit cannot charge and discharge at the same time. $E_{i,t}$ is the energy level or state of charge (SOC) level at time t with the upper limit $\bar{E}i$. $\eta_i^{ch} \in (0,1]$ and $\eta_i^{dc} \in (0,1]$ denote the charging and discharging efficiency coefficients, respectively. $k_i \in (0,1]$ denotes the storage efficiency factor that models the energy loss over time. Based on the ES power model, an exemplary embodiment of the carbon emission model for ES recites:

$$Fi, t+1 = \kappa i Fi, t + \Delta t(\rho i, \textit{t}\eta chi\, Pchi, t - \rho esi, \textit{t}\eta dci Pdci, t),$$

$$\rho_{i,t}^{es} = Fi, t / Ei, t.$$

When ES units are connected to the grid, the carbon flow equation in carbon flow model at time t is modified as $$\rho i, t = \frac{\rho_{i,t}^{es} P_{i,t}^{dc} + \sum k \in g i \rho_{i,k,t}^{G} P_{i,k,t}^{G} + \sum j \in N_i^+ \rho j, t P j i, t}{P_{i,t}^{dc} + \sum k \in g i P_{i,k,t}^{G} + \sum j \in N_i^+ P j i, t}$$

or each node $i \in N$. The equation above indicates that an ES unit affects the carbon flow or the nodal carbon intensity only when it discharges, and it behaves like a load when charging. When discharging, the ES carbon intensity follows $$\rho_{i,t+1}^{es} = \frac{Fi, t+1}{Ei, t+1} = \frac{k i \rho_{i,t}^{es} Ei, t - \Delta t * \frac{\rho_{i,t}^{es}}{n_i^{dc}} * P_{i,t}^{dc}}{k i E_{i,t} - \Delta t * \frac{1}{n_i^{dc}} * P_{i,t}^{cd}} = \rho_{i,t}^{es}$$

which shows that the ES carbon intensity $\rho_{i,t}^{es}$ remains the same during discharging. When charging, the ES carbon intensity follows $$\rho_{i,t+1}^{es} = \frac{Fi, t+1}{Ei, t+1} = \frac{k i \rho_{i,t}^{es} Ei, t + \rho_{i,t} * \Delta t n_i^{ch} P_{i,t}^{ch}}{k i E_{i,t-1} + \Delta t n_i^{ch} P_{i,t}^{ch}} = \lambda i, t * \rho_{i,t}^{es} + (1-\lambda i, t) * \rho_{i,t}$$

which can be viewed as a linear combination of the ES carbon intensity and the nodal carbon intensity $\rho_{i,t}$ with the energy weight $$\lambda i, t := \frac{k i E_{i,t}}{k i E_{i,t} + \Delta t n_i^{ch} P_{i,t}^{ch}}$$

The carbon emission leakage associated with energy storage operation loss during [t−1, t] is:

$$Li, t = (1 - \kappa i) C_{i,t-1} + \Delta t \cdot \rho i, t \left(1 - n_i^{ch}\right) P_{i,t}^{ch} + \Delta t \cdot \rho_{i,t-1}^{es} \left(\frac{1}{n_i^{dc}} - 1\right) P_{i,t}^{dc}.$$

With continued reference to FIG. 3, additionally, or alternatively, emission value may be directly measured hourly. For instance, emission value may be derived directly from continuous emissions monitoring system (CEMS) data; however, there are several limitations that make its use challenging as a default option. As a non-limiting example, not all generation sources are equipped with CEMS and report this data, and this data, in some cases, only includes CO2 and no other greenhouse gases as described herein. In some cases, CEMS data may be only published publicly once per quarter with a month lag, resulting in up to a four-month delay in availability. In the absence of CEMS data, system 100 as described herein may implement a standard approach used to estimate emissions; for example, and without limitation, processor 104 may apply a generator-specific annual average emission factor derived from historical emissions and generation data for that generation source. It should be noted that several drawbacks may be presented by this method. In an embodiment, generator heat rates may change over time, and for multi-fuel plants, the mix of fuels may be burned in one year, thus, this may not reflect the mix of fuels being burned today, leading to potentially inaccurate estimations compared to measured emissions data. Furthermore, these challenges may be magnified when, for example, and without limitation, attempting to estimate a generation source's emissions on an hourly basis. In some cases, generator heat rates not only change over time but also vary based on factors such as, without limitation, generator's operating level and ambient temperatures which may fluctuate from interval to interval. For generation sources e.g., fuel-switching generators, an annual emission factor may provide reasonable annual total emissions estimates but may result in significant hour-specific errors in emissions calculations as described herein. To address these challenges, system 100 as described herein may, for example, and without limitation, convert measured generation data to emissions data based on generator-specific, modeled heat rate curves and fuel-switching information derived from historical operating data, enabling high-quality, hourly emission estimates to be produced, as soon as generation data becomes available, and more accurate and timely emissions reporting.

Now referring to FIGS. 4A-C, an exemplary workflow of an hourly energy allocation 400 according to one embodiment is illustrated. In some cases, at least one actionable energy model may include an automatically executed program, once selected and finalized, to proportionally allocate plurality of energy attribute records 404 to associated load center of plurality of load centers 116a in grid network. In an embodiment, as shown in FIG. 4A, a first portion of plurality of energy attribute records 404a e.g., renewable energy attribute records such as total reserved green program generation may be identified from inventory 408 according to at least one actionable energy model. In some cases, first portion of plurality of energy attribute record 404a may be less than, for example, total energy load 412a and 412c at operational hour 1 and 3 of a load center. In other cases, first portion of plurality of energy attribute record 404b may be greater than, for example, total energy load 412b at operational hour 2 of the load center. System 100 may allocate, as a function of at least one actionable energy model, a pre-determined percentage of first portion of plurality of energy attribute record 404a to each load at each operational hour. As a non-limiting example, as shown in FIG. 4B, 50% of first portion of plurality of energy attribute record 404a may be allocated to each energy load 412a-c. A second portion of plurality of energy attribute records 404b representing, for example, no-renewable energy attribute records such as coal, oil, gas generated energy blend may be allocated from inventory 408 to cover the remainder of each energy load 412a-c over three different operational hours 1-3.

Figure 5A:
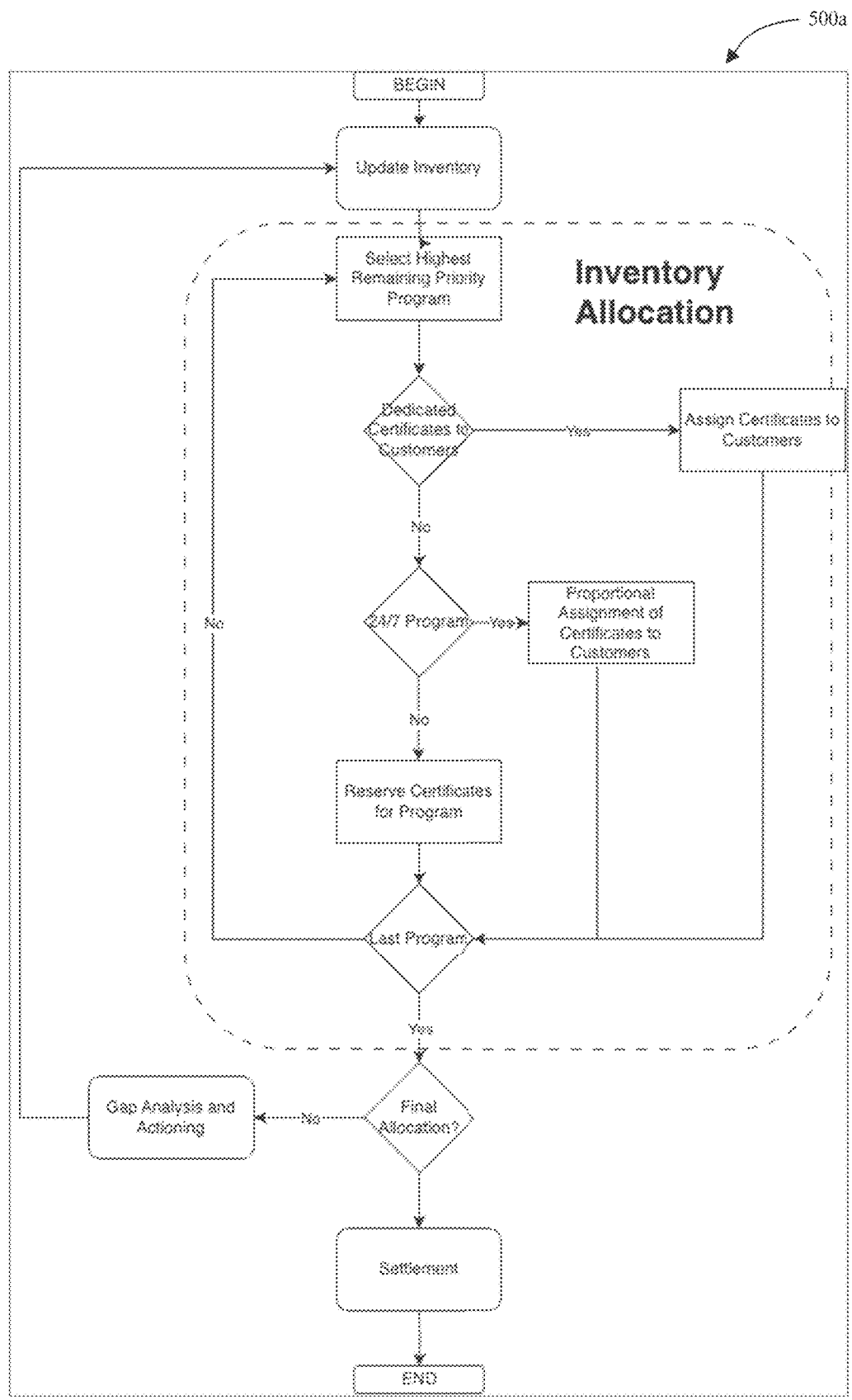
FIGS. 5A-B are exemplary workflows of inventory allocation within an energy management system via different approaches.

Now referring to FIG. 5A, an exemplary workflow 500a of inventory allocation within an energy management system via a procedural, rule-based approach with sequential prioritized operations. At a high-level, system 100 as described herein may be configured to iteratively update inventory, selecting actionable energy models (e.g., programs), assigning energy attribute records (e.g., certificates), and performing a gap analysis to ensure optimal energy resource allocation across grid network 112.

With continued reference to FIG. 5A, processor 104 may be configured to update inventory, such as any database or data store containing plurality of energy attribute records 128 as described above with reference to FIGS. 1-2, based on newly collected energy datasets to reflect current status of "available" energy attribute records e.g., available RECs. Processor 104 may then select, based on priority order 152, one or more programs i.e., actionable energy models from plurality of remaining priority programs that need to be allocated at least a portion of plurality of energy attribute records 128. In some cases, matching engine 140 (e.g., a rule engine) may be configured to check, for example, if the selected program has dedicated energy attribute records or certificates for each customer. If true, processor 104 may allocate dedicated certificates to customers, and if false, matching engine may then check, for each selected program, whether the program is configured on hourly-basis (e.g., 24/7 program) which requires, without limitation, a continuous energy allocation. Processor 104 may allocate, for hourly program, certificates proportionally at each hour, or in other cases, reserve necessary certificates for selected program.

With continued reference to FIG. 5A, processor 104 may be configured to determine, for example, whether the current program in question is a "last program" (i.e., final energy program being considered for allocation of energy attribute records during current allocation cycle). In an embodiment, last program may be associated with a lowest priority order. In another embodiment, last program may be associated with a highest priority order. Processor may make a final allocation, upon a positive determination of last program, wherein the "final allocation," for the purpose of this disclosure, is a processing step that ensures all energy certificates have been appropriately distributed among plurality of programs and customers based on defined criteria and priorities as described above. As a non-limiting example, final allocation may verify whether the allocation process is complete and if any remaining certificates (within corresponding inventory of the customer) need to be distributed. In other cases, if the allocation is not final, further actions e.g., adjustments to the programs may be necessary.

With continued reference to FIG. 5A, a gap analysis may be performed if the allocation is not final. As a non-limiting example, processor 104 may be configured to identify any discrepancies or shortfalls in allocation of plurality of energy attribute record to check whether there are any gaps between expected allocation and actual distribution of certificates. For instance, unallocated certificates, programs, or customers that received less than their required share, or mismatches in certificate types e.g., renewable vs. non-renewable may be identified as a result of gap analysis. In some cases, gap analysis may involve comparing, for example, expected allocation outcomes with actual distribution of energy certificates. One or more programmed corrective actions may be executed to address these discrepancies once gaps are identified. Exemplary embodiments of gap analysis may include, without limitation, reallocating certificates, adjusting priorities, or other measures to ensure accurate distribution. Processor 104 may finalize the distribution (e.g., settlement) to confirm that, for example, all allocations, generating reports, and all transactions are complete and accurate. As a non-limiting example, all energy attribute records in client's corresponding inventory may be accounted for and an allocation report e.g., a report or any other necessary documentation for regulatory compliance may be generated at the point which, for example, user such as inventory managers or business owners are satisfied with current state of allocation and want to finalize it. In some cases, finalizing the distribution may make the distribution immutable (unchangeable) going forward.

Figure 5B:
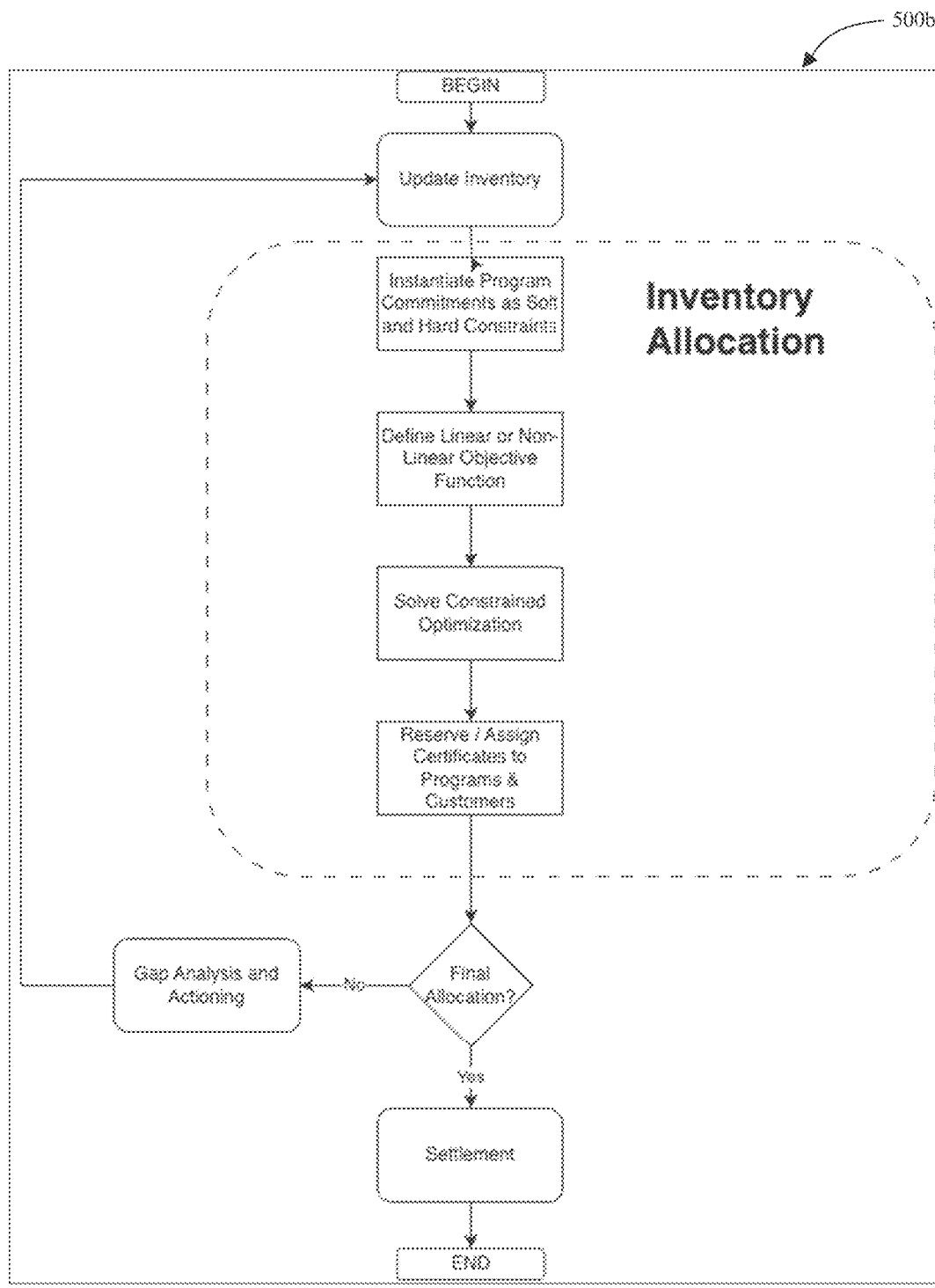

Now referring to FIG. 5B, an exemplary workflow 500*b* of an alternative inventory allocation within an energy management system via a constrained optimization approach (using either linear or nonlinear programing). Processor 104 in this case, may define a plurality of constraints for various programs to regulate and/or optimize allocation process as described herein. In one or more embodiments, plurality of constraints may include one or more soft constraints e.g., flexible requirements that can be adjusted if necessary to find a feasible solution. In other embodiments, plurality of constraints may include one or more hard constraints e.g., non-negotiable requirements that must be strictly adhered to during the allocation process. In some cases, plurality of constraints may include a mix of one or more soft constraints and hard constraints. As a non-limiting example, system 100 may prefer to allocate a higher proportion of RECs to certain programs or customers. If renewable energy supply is insufficient, system 100 may, under a set of soft constraints, adjust this preference and allocate a mix of renewable and non-renewable energy attribute certificates; however, under a set of hard constraints, system 100 may must allocate a certain percentage of energy from renewable sources to comply certain regulatory requirements which cannot be compromised, regardless of other optimization goals.

With continued reference to FIG. 5B, in some cases, processor 104 may define, based on one or more linear or non-linear objective functions, one or more criteria or goals of optimization. In one or more embodiments, linear objective function may include a simple proportional relationship while non-linear objective function, in some cases, may include relationship between a plurality of variables that are not linear necessary for a more complex scenario. As a non-limiting example, a linear objective function may be one where the relationship between plurality of variables e.g., decision variables is linear. Each variable may be multiplied by a constant coefficient and summed to form the function:

$$f_1(x) = c_1 x_1 + c_2 x_2 + \ldots + c_n x_n$$

Where $f_1(x)$ is the linear objective function, $x_i$ are the decision variables, and $c_i$ are the constant coefficients. On the hand, non-linear objective function may include plurality of decision variables that have non-linear relationships e.g., quadratic terms, exponential functions, or other non-linear expressions:

$$f_2(x) = c_1 x_1^2 + c_2 \log\log(x_2) + \ldots + c_n e^{x_n}$$

Where $f_2(x)$ is the non-linear objective function, $x_i$ are the decision variables, and $c_i$ are the coefficients. Exemplary embodiments of decision variables may include, without limitation, amount of energy allocated from generation sources to load centers including both renewable energy and non-renewable energy, both carbon-free and non-carbon free, total amount of energy generated by generation sources, capacity of generation sources, reserved capacity of generation sources for a given load center, emission value, cost of energy allocated, cost of energy generated, energy demand including both renewable energy and non-renewable energy, energy load of load center, current load served by generation sources, amount of energy attribute records stored in the inventory, operational status of generation sources, among others.

With continued reference to FIG. 5B, once linear or non-linear objective function is defined, processor 104 may be configured to solve, mathematically, constrained optimization of energy resource allocation by, for example, finding optimal values for decision variables that minimize or maximize objective function while satisfying all defined constraints. In one or more embodiments, processor 104 may use optimization methods, such as, without limitation, linear programming, nonlinear programing, mixed-integer linear programing, to implement, for example, one or more optimization algorithms e.g., simplex method, interior-points method, gradient descent, branch and bound, and/or the like to solve, given input data such as energy generation capacities, costs, demands, emission values, to find an optimal allocation. In some cases, optimization algorithms may iteratively adjust one or more decision variables to move current allocation towards optimal allocation while respecting defined constraints. Processor 104 may then use the optimal allocation to reserve and/or assign a portion of plurality of energy attribute records to programs and customers.

With continued reference to FIG. 5B, as a non-limiting example, a particularly relevant use case involves the production and utilization of hydrogen as a clean energy source, in alignment with section 45V of the internal revenue code, which provides tax credits for hydrogen production. Achieving a sufficient percentage of carbon-free energy (CFE) is essential for earning tax credits. Processor 104 may define, for example, an objective as to earn tax credit by achieving a sufficient percentage of carbon-free energy based on 45V tax credit regulation to optimize energy allocation as described herein, ensuring that hydrogen production facilities utilize the maximum amount of carbon-free energy to qualify for the tax credit. For instance, and without limitation, for each load center of plurality of load centers 116a, matching engine 140 and/or machine learning model may be configured to determine optimal designations of generation sources for hydrogen production facilities that maximize carbon-free energy usage.

Figure 6:
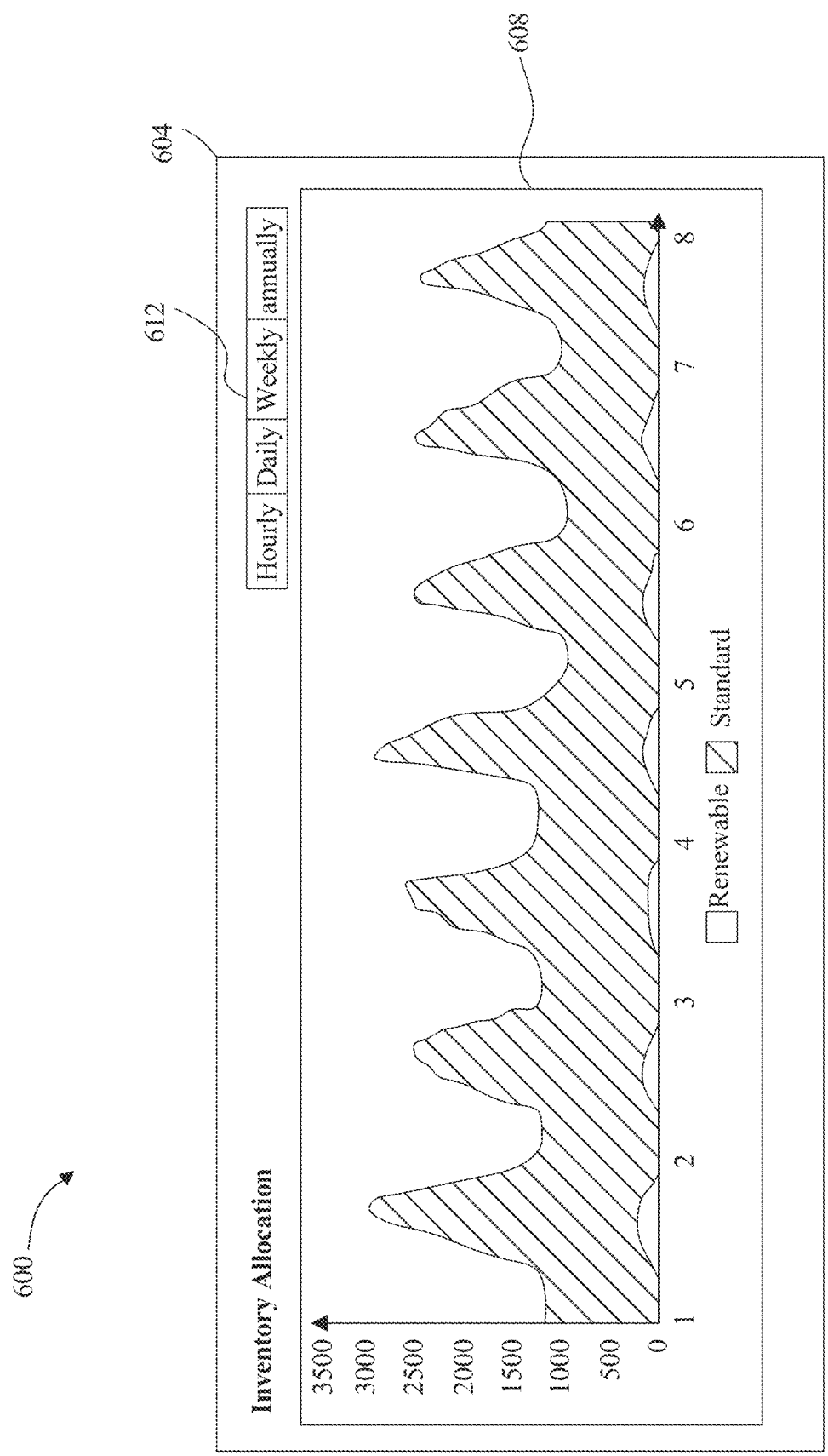
FIG. 6 is an exemplary embodiment of a user interface.

Now referring to FIG. 6, an exemplary embodiment of a user interface 600 is illustrated. User interface 600 may be configured to display an allocation report 604, wherein the allocation report 604, may include, as described above with reference to FIG. 1, a comprehensive view of inventory allocation within an energy management system. As a non-limiting example, allocation report 604 may include detailed information related to allocation of both renewable energy attribute certificates and non-renewable energy attribute certificates over specified time intervals, allowing users to monitor, analyze, and optimize energy resource distribution specified by at least one actionable energy model. User interface 600 may include a visualization 608 of at least one actionable energy model. Visualization 608 may include, for example, a graphical representation of inventory allocation overtime. As a non-limiting example, visualization 608 may include a stacked bar chart showing allocation of different energy attribute records e.g., number of certificates allocated, to a load center on an hourly basis e.g., hour 1, 2, 3, 4, 5, 6, 7, and 8. In some cases, user interface 600 may include a widget 612 configured for time interval selection; for instance, and without limitation, user may toggle different time intervals to view allocation data at various levels of granularity e.g., hourly, daily, monthly, or annually. Additionally, or alternatively, users such as customers may use user interface 600 to monitor, for example, without limitation, how well the program are being supported by allocated energy certificates and explaining how energy usage aligns with allocated certificates.

Figure 7:
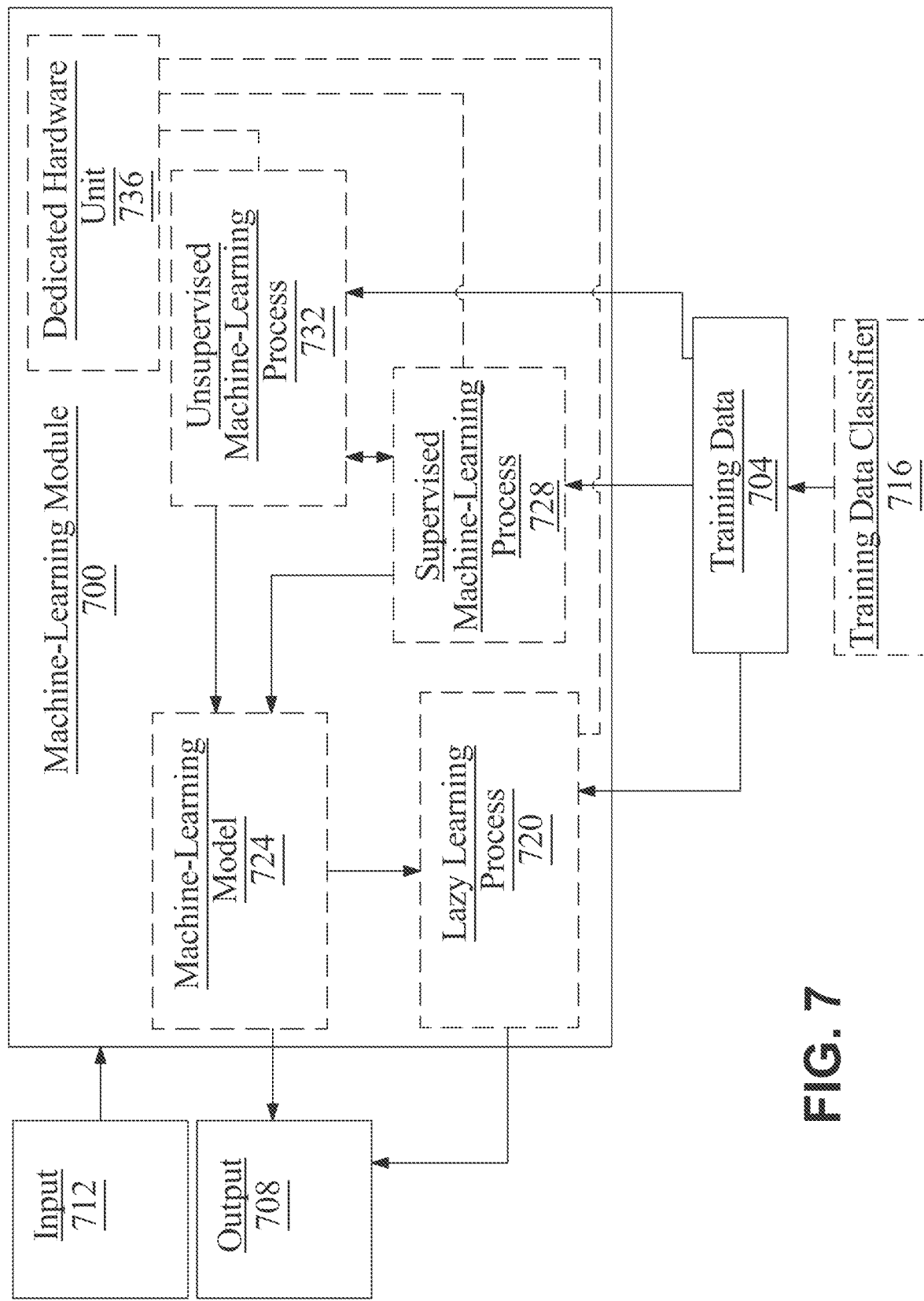
FIG. 7 is a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm instantiated in hardware or software logic, data structures, and/or functions that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, training data may include examples of energy datasets paired with examples of energy load data as inputs, correlated to examples of examples of actionable energy models as outputs.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 7, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 7, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 7, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 7, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

With continued reference to FIG. 7, in some embodiments, computing device, processor, and/or module may down-sample elements of a training example to a desired lower number of data elements. As a non-limiting example, a high pixel count image may have 756 pixels, however a desired number of pixels may be 128. Processor may down-sample the high pixel count image to convert the 756 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include examples of energy datasets paired with examples of energy load data as described above as inputs, examples of actionable energy models as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

With further reference to FIG. 7, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 7, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 732 may not require a response variable; unsupervised processes 732 may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 7, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 7, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 7, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 7, one or more processes or algorithms described above may be performed by at least a dedicated hardware unit 736. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 736 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 736 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 736 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 8:
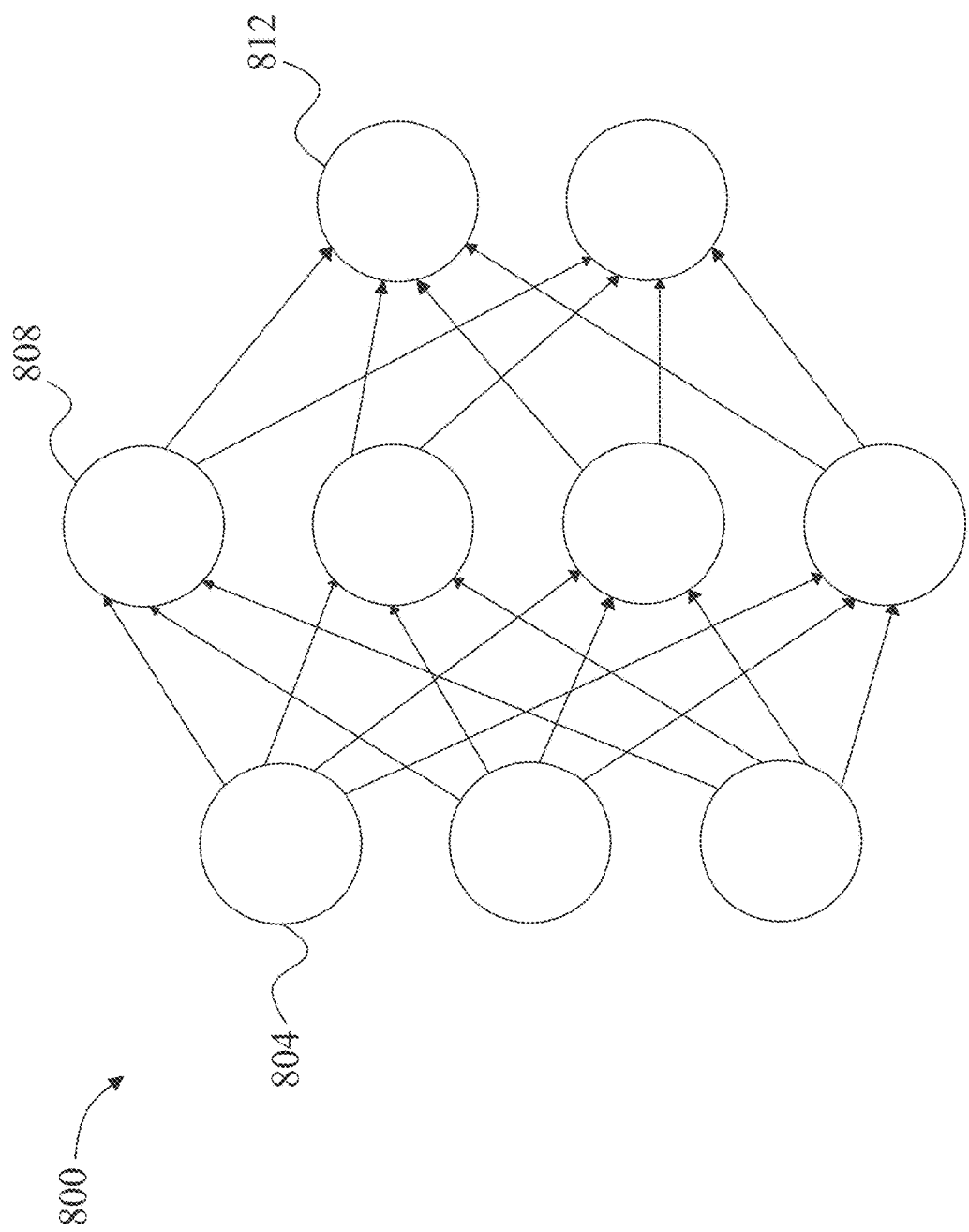
FIG. 8 is a diagram of an exemplary embodiment of a neural network.

Referring now to FIG. 8, an exemplary embodiment of neural network 800 is illustrated. A neural network 800, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
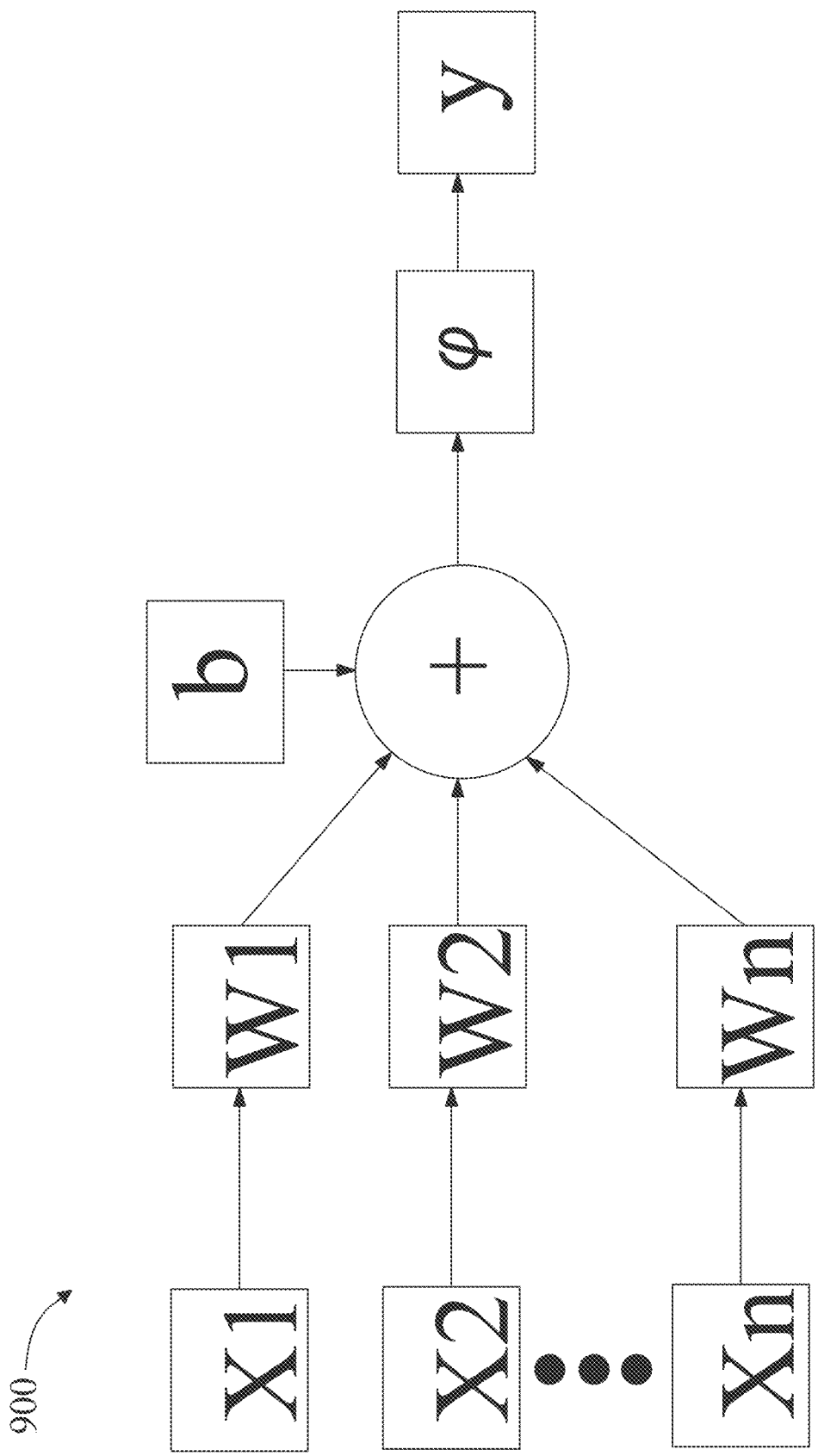
FIG. 9 is a diagram of an exemplary embodiment of a node of a neural network.

Referring now to FIG. 9, an exemplary embodiment of a node 900 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=(x)$, a rectified linear unit function such as $f(x)=\max(0, x)$, a "leaky" and/or "parametric" rectified linear unit function such as $f(x)=\max(ax, x)$ for some a, an exponential linear units function such as $f(x)=\{x$ for $x\geq 0$ $\alpha(e^x-1)$ for $x<0$ for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}(x + bx^r)\right)\right)$$

for some values of a, b, and r, and/or a scaled exponential linear unit function such as $f(x)=\lambda\{\alpha(e^x-1)$ for $x<0$ x for $x\geq 0$. Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 10:
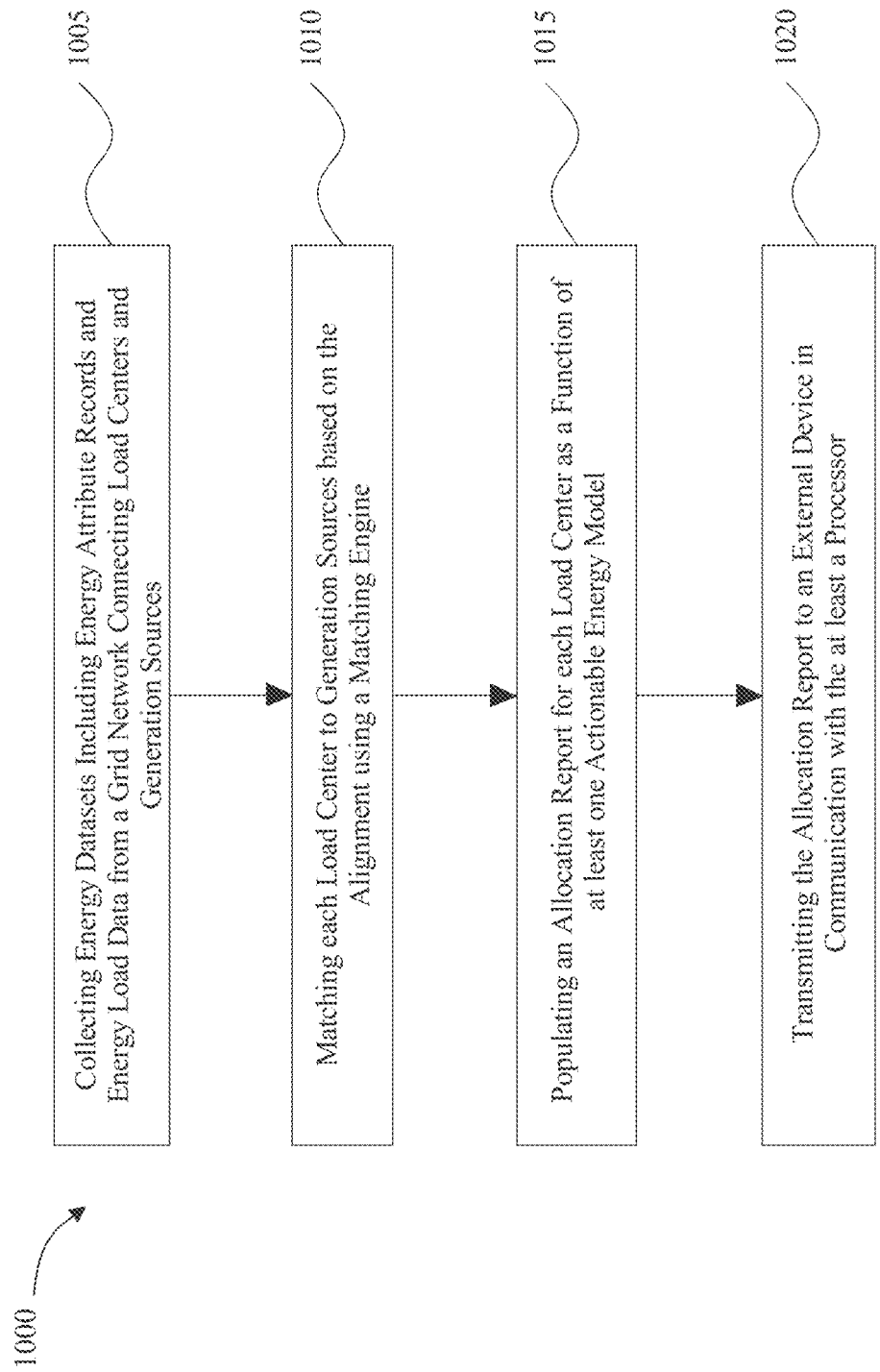
FIG. 10 is a flow diagram of an exemplary method for automating matching of energy load with energy generation for energy consumers, utilities, and grid operators.

Now referring to FIG. 10, a flow diagram of an exemplary embodiment of a method 1000 for automating matching of energy load with energy generation for energy consumers, utilities, and grid operators is illustrated. The method 1000 includes a step 1005 of collecting, by at least a processor, a plurality of energy datasets from a grid network connecting a plurality of load centers and a plurality of generation sources, wherein the plurality of energy datasets includes a set of energy attribute records and energy load data. In some embodiments, collecting the plurality of energy datasets may include serializing the set of energy attribute records into a plurality of energy attribute certificates and generating an inventory configured to store the serialized plurality of energy attribute certificates. In some embodiments, the plurality of energy attribute certificates may include one or more carbon-free energy certificates and non-carbon-free energy certificates. In some embodiments, collecting the plurality of energy datasets may include calculating an emission value for each energy dataset of the plurality of energy datasets and associating the calculated emission value with each energy attribute record of the set of energy attribute records. This may be implemented, without limitation, as described above with reference to FIGS. 1-9.

With continued reference to FIG. 10, method 1000 includes a step 1010 of matching, by the at least a processor, each load center of the plurality of load centers to the one or more generation sources of the plurality of generation sources based on the plurality of energy datasets using a matching engine, wherein matching the plurality of load centers to the plurality of generation sources includes generating a plurality of actionable energy models, each of the plurality of actionable energy models representing a configurable allocation of the set of energy attribute records, based on the plurality of energy datasets and matching, as a function of at least one actionable energy model of the plurality of actionable energy models, each load center of the plurality of load centers to the one or more generation sources of the plurality of generation sources. In some embodiments, the configurable allocation of the set of energy attribute records may include a configurable allocation of the plurality of energy attribute certificates from the inventory to each load center of the plurality of load centers. In some embodiments, generating the plurality of actionable energy models may include training a machine learning model using energy training data, wherein the energy training data contains examples of energy datasets as inputs, correlated to examples of designations of generation source as outputs, determining, for each load center of the plurality of load centers, one or more designations of generation source as a function of the energy load data using the trained machine learning model, and generating, for each load center of the plurality of load centers, the plurality of actionable energy models as a function of the one or more designations of generation source. In some embodiments, matching each load center of the plurality of load centers to the one or more generation sources of the plurality of generation sources may include identifying, for each actionable energy model of the plurality of actionable energy models, a priority order as a function of the energy load data, ranking, based on the priority orders, the plurality of actionable energy models, and matching each load center of the plurality of load centers to the one or more generation sources of the plurality of generation sources as a function of at least one highest ranked actionable energy model of the plurality of actionable energy models. In some embodiments, the configurable allocation of the set of energy attribute records may be performed on an hourly basis. This may be implemented, without limitation, as described above with reference to FIGS. 1-9.

With continued reference to FIG. 10, method 1000 includes a step 1015 of populating, by the at least a processor, an allocation report for each load center of the plurality of load centers within the grid network as a function of the at least one actionable energy model. In some embodiments, the allocation report may include a visualization of the at least one actionable energy model. This may be implemented, without limitation, as described above with reference to FIGS. 1-9.

With continued reference to FIG. 10, method 1000 includes a step 1020 of transmitting, by the at least a processor, the populated allocation report to an external device in communication with the at least a processor. In some embodiments, transmitting the allocation report comprises displaying, at a display device communicatively connected to the at least a processor, the allocation report using a user interface. This may be implemented, without limitation, as described above with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
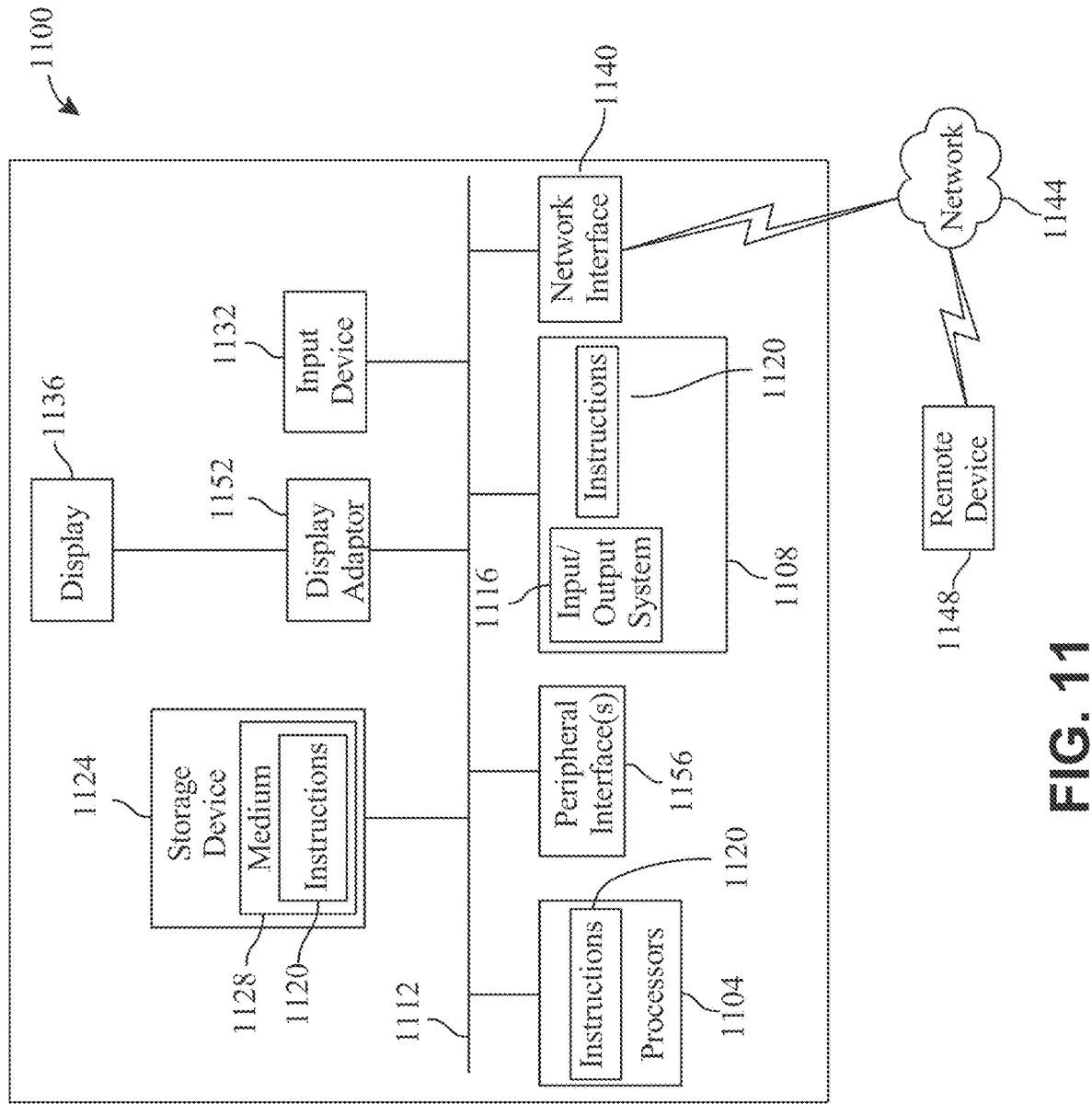
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for automating matching of energy load with energy generation for energy consumers, utilities, and grid operators, the system comprises:
    at least a processor; and
    a memory communicatively connected to the at least a processor, wherein the memory contains instructions configuring the at least a processor to:
        collect, from a grid network connecting a plurality of load centers and a plurality of generation sources, a plurality of energy datasets, wherein the plurality of energy datasets includes a set of energy attribute records and energy load data;
        match, using a matching engine, each load center of the plurality of load centers to one or more generation sources of the plurality of generation sources based on the plurality of energy datasets, wherein matching the plurality of load centers to the plurality of generation sources comprises:
            generating a plurality of actionable energy models, each of the plurality of actionable energy models representing a configurable allocation of the set of energy attribute records, based on the plurality of energy datasets; and
            matching, as a function of at least one actionable energy model of the plurality of actionable energy models, each load center of the plurality of load centers to the one or more generation sources of the plurality of generation sources, wherein each of the plurality of actionable energy models comprises a competing model, wherein matching each load center of the plurality of load centers to the one or more generation sources of the plurality of generation sources further comprises:
                ranking, based on a first objective, a first actionable energy model of the plurality of actionable energy models as a highest ranked actionable energy model for achieving the first objective;
                ranking, based on a second objective, a second actionable energy model of the plurality of actionable energy models as a highest ranked actionable energy model for achieving the second objective; and
                matching a respective load center of the plurality of load centers to the one or more generation sources of the plurality of generation sources as a function of the first actionable energy model and the second actionable energy model of the plurality of actionable energy models;
        populate, as a function of the first actionable energy model and the second actionable energy model, an allocation report for each load center of the plurality of load centers within the grid network; and
        transmit the populated allocation report to an external device in communication with the at least a processor.

2. The system of claim 1, wherein collecting the plurality of energy datasets comprises:
    serializing the set of energy attribute records into a plurality of energy attribute certificates; and
    generating an inventory configured to store the serialized plurality of energy attribute certificates.

3. The system of claim 2, wherein the plurality of energy attribute certificates comprises one or more carbon-free energy certificates and non-carbon-free energy certificates.

4. The system of claim 2, wherein the configurable allocation of the set of energy attribute records comprises an allocation of the plurality of energy attribute certificates from the inventory to each load center of the plurality of load centers.

5. The system of claim 1, wherein collecting the plurality of energy datasets comprises:
    calculating an emission value for each energy dataset of the plurality of energy datasets; and
    associating the calculated emission value with each energy attribute record of the set of energy attribute records.

6. The system of claim 1, wherein generating the plurality of actionable energy models comprises:
    training a machine learning model using energy training data, wherein the energy training data comprises examples of energy datasets as inputs, correlated to examples of designations of generation source as outputs; and
    determining, for each load center of the plurality of load centers, one or more designations of generation source as a function of the energy load data using the trained machine learning model; and
    generating, for each load center of the plurality of load centers, the plurality of actionable energy models as a function of the one or more designations of generation sources.

7. The system of claim 1, wherein the configurable allocation of the set of energy attribute records is performed on an hourly basis.

8. The system of claim 1, wherein the allocation report comprises a visualization of the at least one actionable energy model.

9. The system of claim 1, wherein transmitting the allocation report comprises displaying, at a display device communicatively connected to the at least a processor, the allocation report using a user interface.

10. A method for automating matching of energy load with energy generation for energy consumers, utilities, and grid operators, the method comprises:
   collecting, by at least a processor and from a grid network connecting a plurality of load centers and a plurality of generation sources, a plurality of energy datasets, wherein the plurality of energy datasets includes a set of energy attribute records and energy load data;
   matching, by the at least a processor and using a matching engine, each load center of the plurality of load centers to one or more generation sources of the plurality of generation sources based on the plurality of energy datasets, wherein matching the plurality of load centers to the plurality of generation sources comprises:
      generating a plurality of actionable energy models, each of the plurality of actionable energy models representing a configurable allocation of the set of energy attribute records, based on the plurality of energy datasets; and
      matching, as a function of at least one actionable energy model of the plurality of actionable energy models, each load center of the plurality of load centers to the one or more generation sources of the plurality of generation sources, wherein each of the plurality of actionable energy models comprises a competing model, wherein matching each load center of the plurality of load centers to the one or more generation sources of the plurality of generation sources further comprises:
         ranking, based on a first objective, a first actionable energy model of the plurality of actionable energy models as a highest ranked actionable energy model for achieving the first objective;
         ranking, based on a second objective, a second actionable energy model of the plurality of actionable energy models as a highest ranked actionable energy model for achieving the second objective; and
         matching a respective load center of the plurality of load centers to the one or more generation sources of the plurality of generation sources as a function of the first actionable energy model and the second actionable energy model of the plurality of actionable energy models;
   populating, by the at least a processor and as a function of the first actionable energy model and the second actionable energy model, an allocation report for each load center of the plurality of load centers within the grid network; and
   transmitting, by the at least a processor, the populated allocation report to an external device in communication with the at least a processor.

11. The method of claim 10, wherein collecting the plurality of energy datasets comprises:
   serializing the set of energy attribute records into a plurality of energy attribute certificates; and
   generating an inventory configured to store the serialized plurality of energy attribute certificates.

12. The method of claim 11, wherein the plurality of energy attribute certificates comprises one or more carbon-free energy certificates and non-carbon-free energy certificates.

13. The method of claim 11, wherein the configurable allocation of the set of energy attribute records comprises an allocation of the plurality of energy attribute certificates from the inventory to each load center of the plurality of load centers.

14. The method of claim 10, wherein collecting the plurality of energy datasets comprises:
   calculating an emission value for each energy dataset of the plurality of energy datasets; and
   associating the calculated emission value with each energy attribute record of the set of energy attribute records.

15. The method of claim 10, wherein generating the plurality of actionable energy models comprises:
   training a machine learning model using energy training data, wherein the energy training data comprises examples of energy datasets as inputs, correlated to examples of designations of generation source as outputs; and
   determining, for each load center of the plurality of load centers, one or more designations of generation source as a function of the energy load data using the trained machine learning model; and
   generating, for each load center of the plurality of load centers, the plurality of actionable energy models as a function of the one or more designations of generation sources.

16. The method of claim 10, wherein the configurable allocation of the set of energy attribute records is performed on an hourly basis.

17. The method of claim 10, wherein the allocation report comprises a visualization of the at least one actionable energy model.

18. The method of claim 10, wherein transmitting the allocation report comprises displaying, at a display device communicatively connected to the at least a processor, the allocation report using a user interface.

19. A non-transitory computer-readable medium containing instructions to:
   collect, by at least a processor and from a grid network connecting a plurality of load centers and a plurality of generation sources, a plurality of energy datasets, wherein the plurality of energy datasets includes a set of energy attribute records and energy load data;
   match, by the at least a processor and using a matching engine, each load center of the plurality of load centers to one or more generation sources of the plurality of generation sources based on the plurality of energy datasets, wherein matching the plurality of load centers to the plurality of generation sources comprises:
      generating a plurality of actionable energy models, each of the plurality of actionable energy models representing a configurable allocation of the set of energy attribute records, based on the plurality of energy datasets; and
      matching, as a function of at least one actionable energy model of the plurality of actionable energy models, each load center of the plurality of load centers to the one or more generation sources of the plurality of generation sources, wherein each of the plurality of actionable energy models comprises a competing model, wherein matching each load center of the plurality of load centers to the one or more generation sources of the plurality of generation sources further comprises:
  ranking, based on a first objective, a first actionable energy model of the plurality of actionable energy models as a highest ranked actionable energy model for achieving the first objective;
  ranking, based on a second objective, a second actionable energy model of the plurality of actionable energy models as a highest ranked actionable energy model for achieving the second objective; and
  matching a respective load center of the plurality of load centers to the one or more generation sources of the plurality of generation sources as a function of the first actionable energy model and the second actionable energy model of the plurality of actionable energy models;
populate, by the at least a processor, as a function of the first actionable energy model and the second actionable energy model, an allocation report for each load center of the plurality of load centers within the grid network; and transmit, by the at least a processor, the populated allocation report to an external device in communication with the at least a processor.

20. The non-transitory computer-readable medium of claim 19, wherein generating the plurality of actionable energy models comprises:
  training a machine learning model using energy training data, wherein the energy training data comprises examples of energy datasets as inputs, correlated to examples of designations of generation source as outputs; and
  determining, for each load center of the plurality of load centers, one or more designations of generation source as a function of the energy load data using the trained machine learning model; and
  generating, for each load center of the plurality of load centers, the plurality of actionable energy models as a function of the one or more designations of generation sources.

* * * * *